(12) United States Patent
Green

(10) Patent No.: US 7,912,351 B2
(45) Date of Patent: Mar. 22, 2011

(54) OBSCURING DATA IN AN AUDIOVISUAL PRODUCT

(76) Inventor: Stuart Green, Sheffield (GB)

( * ) Notice: Subject to any disclaimer, the term of this patent is extended or adjusted under 35 U.S.C. 154(b) by 1114 days.

(21) Appl. No.: 10/862,794

(22) Filed: Jun. 7, 2004

(65) Prior Publication Data

US 2005/0019017 A1    Jan. 27, 2005

Related U.S. Application Data

(60) Provisional application No. 60/480,322, filed on Jun. 20, 2003.

(30) Foreign Application Priority Data

Jun. 5, 2003 (GB) .................................. 0312874.1

(51) Int. Cl.
*H04N 9/80* (2006.01)
(52) U.S. Cl. .................... 386/258; 386/248; 386/254
(58) Field of Classification Search ............... 386/1, 46, 386/125–126, 94, 121, 52–55, 95, 96, 111–112; 369/275; 707/100; 726/26–33; 380/210
See application file for complete search history.

(56) References Cited

U.S. PATENT DOCUMENTS

| | | | |
|---|---|---|---|
| 4,405,942 A | 9/1983 | Block et al. | |
| 4,668,985 A | 5/1987 | Kurashige et al. | |
| 5,535,275 A * | 7/1996 | Sugisaki et al. | 380/203 |
| 5,541,904 A | 7/1996 | Fite et al. | |
| 5,691,972 A * | 11/1997 | Tsuga et al. | 369/275.3 |
| 6,041,160 A * | 3/2000 | Yagasaki et al. | 386/94 |
| 6,144,401 A * | 11/2000 | Casement et al. | 725/30 |
| 6,360,057 B1 | 3/2002 | Tsumagari et al. | |
| 6,385,388 B1 | 5/2002 | Lewis et al. | |
| 6,430,360 B1 | 8/2002 | Oh et al. | |
| 6,694,435 B2 * | 2/2004 | Kiddy | 713/189 |
| 6,707,774 B1 | 3/2004 | Kuroda et al. | |
| 6,940,873 B2 | 9/2005 | Boyle et al. | |
| 7,159,118 B2 * | 1/2007 | Petrovic | 713/176 |
| 7,457,415 B2 * | 11/2008 | Reitmeier et al. | 380/210 |
| 7,574,103 B2 * | 8/2009 | Green | 386/69 |
| 7,574,117 B2 * | 8/2009 | Green | 386/125 |
| 7,609,944 B2 * | 10/2009 | Basile | 386/95 |
| 7,702,215 B2 * | 4/2010 | Green | 386/95 |
| 2001/0019612 A1 | 9/2001 | Kitani et al. | |
| 2001/0037459 A1 | 11/2001 | Ogawa et al. | |
| 2002/0031336 A1 | 3/2002 | Okada et al. | |
| 2002/0085713 A1 | 7/2002 | Feig et al. | |
| 2002/0097870 A1 | 7/2002 | Nelson | |
| 2002/0099955 A1 * | 7/2002 | Peled et al. | 713/200 |

(Continued)

FOREIGN PATENT DOCUMENTS

EP    0 677 842 A1    10/1995

(Continued)

*Primary Examiner* — Thai Tran
*Assistant Examiner* — Hung Q Dang
(74) *Attorney, Agent, or Firm* — Daniel W. Roberts; Law Offices of Daniel W. Roberts, LLC

(57) ABSTRACT

Access to an audiovisual product is controlled by obscuring data. Cells 420 of audiovisual data A, B, C are reproduced by a sequence instruction 410 (e.g. a PGC or Program Chain). One such sequence instruction 410*a* correctly reproduces the audiovisual data A, B, C, but is hidden amongst many other sequence instructions 410*b* which incorrectly reproduce the sequence of cells 420 (e.g. as BAC, ACB, CAB, etc.).

55 Claims, 17 Drawing Sheets

U.S. PATENT DOCUMENTS

2002/0106191 A1 * 8/2002 Betz et al. .............. 386/70
2002/0146238 A1 10/2002 Sugahara
2003/0014751 A1 1/2003 Paek

FOREIGN PATENT DOCUMENTS

| | | |
|---|---|---|
| EP | 0 769 780 A2 | 4/1997 |
| EP | 0 890 948 A1 | 1/1999 |
| EP | 0 949 815 A2 | 10/1999 |
| EP | 0 984 346 A | 3/2000 |
| EP | 1 249 835 A | 10/2002 |
| EP | 1 249 835 A2 | 10/2002 |
| WO | WO 91/13517 | 9/1991 |
| WO | WO 95/12275 A | 5/1995 |
| WO | WO 96/24223 | 8/1996 |
| WO | WO 00/05715 | 2/2000 |
| WO | WO 02/073617 A1 | 9/2002 |
| WO | WO 03/032300 A2 | 4/2003 |

* cited by examiner

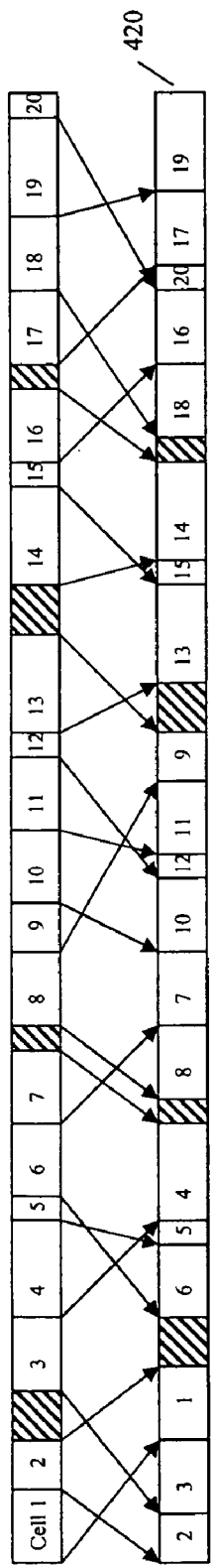
Fig. 12
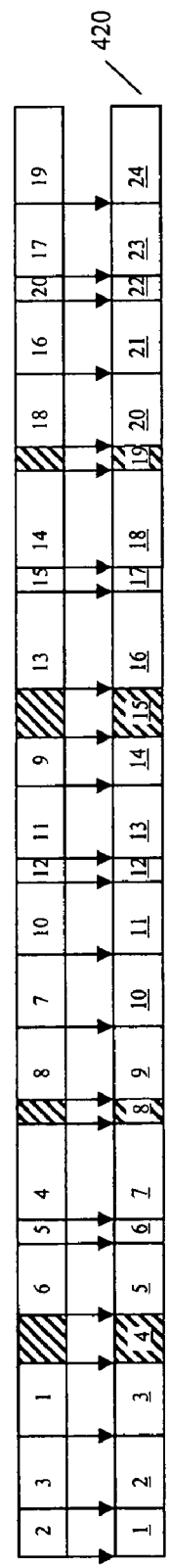
Fig. 13
3 1 2 7 6 5 10 9 14 11 13 12 16 18 17 21 23 20 24 22
Fig. 14

| n | $r_n$ | $r_n \bmod 4 + 1$ |
|---|---|---|
| 0 | 0 | 1 |
| 1 | 3 | 4 |
| 2 | 7 | 4 |
| 3 | 1 | 2 |
| 4 | 10 | 3 |
| 5 | 5 | 2 |
| 6 | 4 | 1 |
| 7 | 14 | 3 |
| 8 | 16 | 1 |
| 9 | 13 | 2 |
| 10 | 9 | 2 |
| 11 | 15 | 4 |
| 12 | 6 | 3 |
| 13 | 11 | 4 |
| 14 | 12 | 1 |
| 15 | 2 | 3 |

Fig. 21

| Instruction | Comment |
|---|---|
| GPRM0 = A | # assumed initial values |
| GPRM1 = B | |
| GPRM2 = C | |
| GPRM3 = m | |
| SPRM3 = angle stream number | |
| MUL GPRM3 GPRM0 | # m = m * A |
| ADD GPRM3 GPRM1 | # m = m * A + B |
| MOD GPRM3 GPRM2 | # m = (m * A + B) mod C |
| MOV SPRM3 GPRM3 | # angle = m |
| MOD SPRM3 4 | # angle = m mod 4 |
| ADD SPRM3 1 | # angle = (m mod 4) + 1 |

Fig. 22

OBSCURING DATA IN AN AUDIOVISUAL PRODUCT

This application claims the benefit of the filing date of U.S. Provisional Patent Application No. 60/480,322, filed on Jun. 20, 2003.

TECHNICAL FIELD AND BACKGROUND OF THE INVENTION

The present invention relates in general to a method and apparatus for use in creating or reproducing an audiovisual product. In particular, the present invention relates to a method and apparatus for use in controlling access to an audiovisual product, by obscuring data within the audiovisual product.

It is desired to control access to an audiovisual product. In particular, it is desired to restrict opportunities that currently exist for audiovisual content to be viewed or otherwise accessed without authorisation.

In general terms, audiovisual content such as a movie or other presentation is formed by gathering together many small sections or clips of raw audio and visual content. This is usually termed an "authoring" process wherein the raw sound clips and video clips are progressively assembled and edited together to form the finished audiovisual product. The audiovisual product is then recorded on some form of recording media. Traditionally, this would be an analogue medium such as celluloid film or analogue video tape (e.g. VHS format video tape). More recently, it has become possible to record audiovisual content onto random access media including in particular optical disk media such as DVDs, or other forms of random storage such as magnetic hard drives. These random access media have many advantages in terms of size, data capacity, playback speed, image quality and so on. However, a disadvantage has also been identified in that it is relatively easy to view or otherwise access a stored audiovisual product, without authorisation.

An optical disc is a convenient storage media for many different purposes. A digital versatile disc (DVD) has been developed with a capacity of up to 4.7 Gb on a single-sided single-layer disc, and up to 17 Gb on a double-sided double-layer disc. There are presently several different formats for recording data onto a DVD disc, including DVD-Video, DVD-Audio, and DVD RAM, amongst others. Of these, DVD-Video is particularly intended for use with pre-recorded video content, such as a motion picture. As a result of the large storage capacity and ease of use, DVD discs are becoming popular and commercially important. Conveniently, a DVD-Video disc is played using a dedicated playback device with relatively simple user controls, and DVD players for playing DVD-Video discs are becoming relatively widespread. More detailed background information concerning the DVD-Video specification is available from DVD Forum at www.dvdforum.org, and elsewhere.

The DVD-Video specification contains a number of built-in copy-protection features that aim to protect the audiovisual data content of the disc. These include Content Scrambling System (CSS), used to encrypt blocks of audio-video data to prevent such data being played separately from the DVD-Video presentation; and Macrovision Copy Protection, used to prevent video being copied using recording devices. Both of these systems are interpreted by the DVD-Video player that performs the appropriate function during playback. While these approaches are effective in protecting data content for average consumers, "reverse engineers" who are skilled and motivated to create copies of discs or parts of discs now easily defeat both systems.

A problem has been identified in that, within the DVD-Video specification, there are no built-in facilities by which content can be held securely on a disc, whilst remaining out of the reach of a reasonably competent reverse engineer. As an example to illustrate this problem, DVD-Video discs sometimes contain so-called "Easter Eggs" which are hidden data on a disc that are accessed such as by inputting a particular key combination (e.g. press a "left arrow" key within 5 seconds of a certain menu appearing). A reverse engineer can easily access such content without knowing the key combination, simply by extracting the relevant audio-video objects directly from the disc. There are a number of DVD-Video interrogation software packages available that can be used to 'rip' each of the individual video presentations on a disc. See, for example, www.dvd-ripper.com, amongst many others.

U.S. Pat. No. 6,161,179 (WEA Manufacturing, Inc) discloses a key-based protection method for light-readable discs, wherein a disk player provides a unique key each time a disk is played. The user communicates the unique key to a transaction service, and receives an unlock key in return. The user communicates the unlock key to the disk player. The disk player then confirms that the unlock key and the unique key have a predetermined relationship, before playing the disk. This known protection method allows pay-per-view or other pay-per-use commercialisations of an audiovisual product distributed on a light-readable disk, such as in a DVD-Video format.

There are a wide range of applications where a greater level of security and protection is required over and above that afforded by the known copy-protection approaches. These problems arise not only in relation to DVD-Video format optical disks but occur in many other environments, especially where audiovisual content is recorded onto a random access storage medium.

An aim of the present invention is to provide, at least in some preferred embodiments thereof, a method and apparatus for use in creating and/or reproducing an audiovisual product, by which a user's access the audiovisual product is restricted. In particular, an aim of the present invention is to restrict copying, viewing or other unauthorised access to an audiovisual product.

SUMMARY OF THE INVENTION

An aim of at least some embodiments of the present invention is to provide a method and apparatus for use in creating or reproducing an audiovisual product, by which even a skilled reverse engineer is faced with substantial obstacles that inhibit free and unfettered access to the audiovisual product.

According to the present invention there is provided an apparatus and method as set forth in the appended claims. Preferred features of the invention will be apparent from the dependent claims, and the description which follows.

Generally, an audiovisual product appropriate to the present invention has plurality of cells of audiovisual data, whose playback is controlled by one or more sequence instructions. Suitably, each of the cells and each of the sequence instructions have a predetermined structure location within the audiovisual product, which enables navigational movements within the audiovisual product, such as from cell to cell and from one sequence instruction to another.

One aspect of the present invention relates to the use of an access code to control access to an audiovisual product, as a form of unlocking process.

In one exemplary aspect of the present invention there is provided a method for use in creating an audiovisual product, comprising the steps of: receiving original audiovisual data intended for playback according to an original content sequence; dividing the original audiovisual data into a plurality of cells; creating a plurality of sequence instructions each representing a playback sequence for playing back the cells in a specified order; allocating the plurality of sequence instructions each to one of a plurality of structural locations within the audiovisual product; and producing a destination function operable, based on an access code, to calculate a destination structural location amongst the plurality of structural locations and thereby select one amongst the plurality of sequence instructions.

In another exemplary embodiment of the present invention there is provided a method for use in reproducing an audiovisual product, comprising the steps of: receiving an access code; calculating a destination structure location within the audiovisual product by applying a destination function to the access code; and jumping to the calculated destination structure location to thereby select a sequence instruction corresponding to that location.

In use, a destination structure location within the audiovisual product is calculated by applying a destination function to a received access code. Jumping to the calculated destination structure location selects a sequence instruction corresponding to that location. The selected sequence instruction consequently initiates reproduction of a sequence of the cells of audiovisual data in the audiovisual product.

Preferably, the access code is input during playback of the audiovisual product. Most preferably, the access code is input by a user through an input device such as a keypad or remote control unit or other communications device. As one example, the access code is a numerical code (e.g. 1234) input through a visual representation of a numerical keypad.

Preferably, the destination function applied to the access code is a mathematical function that returns a numerical value of the destination location dependent upon the received access code. The access code may take any suitable form but preferably comprises a numerical value within a predetermined range, such that the destination function when applied to the numerical value of the access code calculates the structure location of the correct sequence instruction and so reveals protected original audiovisual data such as an "Easter egg" feature or a section of a movie. By contrast, when the destination function is applied to an incorrect numerical value, some other structure location is derived. For example, the destination function leads to a structure location which causes a message to be displayed such as "Access Denied", or leads to an incorrect sequence instruction which results in unsatisfactory playback of the original audiovisual data.

The destination function suitably comprises a one way hash function. Preferably, the destination function operates on at least two access codes each having numerical values. Preferably, the destination function is applied to generate a first access code for display to a user, and then to operate on a second access code provided in return. The destination function may generate a seed and apply a transformation to generate the first access code, such that a seed of the first access code is held secret and is not revealed to a user.

This aspect of the present invention may be embodied in many different specific forms, according to the manner in which the access code is related to the destination function, and the manner in which audiovisual content is thereby unlocked for enjoyment by the user. This unlocking method is particularly useful in preventing free and unfettered access to an audiovisual product by ordinary consumers. That is, most ordinary consumers will only have access to the audiovisual product, or selected locked sections of the audiovisual product, once they have possession of a correct unlocking access code.

Another aspect of the present invention relates to obscuring data within an audiovisual product.

In one exemplary embodiment the present invention provides a method for use in creating an audiovisual product, comprising the steps of: receiving original audiovisual data intended for playback according to an original content sequence; dividing the original audiovisual data into a plurality of cells; and creating a plurality of sequence instructions each representing a playback sequence for playing back the cells in a specified order, including: at least one correct sequence instruction where the playback sequence reproduces the original content sequence; and a plurality of incorrect sequence instructions where the playback sequence does not reproduce the original content sequence.

In another exemplary embodiment the present invention provides a method for use in reproducing an audiovisual product, comprising the steps of: receiving the audiovisual product, wherein a plurality of sequence instructions include at least one correct sequence instruction for reproducing the audiovisual product according to an original playback sequence, and a plurality of incorrect sequence instructions which do not reproduce the audiovisual product according to the original playback sequence; selecting one amongst the plurality of sequence instructions; and reproducing the audiovisual data in the cells according to the selected sequence instruction.

This aspect of the present invention provides a simple but effective mechanism for controlling access to the original audiovisual data presented in the audiovisual product.

Original content is divided into cells, which are to be played back in an order according to a playback sequence instruction. One or more correct sequence instructions, which allow an original content sequence to be reconstructed from the cells, are themselves hidden amongst a plurality of incorrect sequence instructions. Advantageously, a relatively large number of sequence instructions are created, where only relatively few (e.g. one or two) properly play back the cells to reconstruct the original content sequence. Suitably, the remaining large number of incorrect sequence instructions each result in an unsatisfactory playback of the audiovisual data from the cells. Such obfuscation of the correct sequence instructions leads to secure and reliable control of access to the original audiovisual data. Only a user who is able select the correct sequence instruction will be able to reveal the original audiovisual data.

Preferably, the plurality of sequence instructions are formed as multiple permuted sequences, where only one such sequence corresponds to the original content sequence. Each of the other multiple permuted sequences reproduces the audiovisual data in the cells, but not according to the original content sequence. Hence, the sequence instructions each closely resemble one another and it is relatively difficult for a reverse engineer to determine which one is correct. As a result, the correct sequence instruction is obfuscated amongst the multiple permuted incorrect sequence instructions.

In one preferred embodiment of the present invention, the cells are arranged other than according to the original content sequence. That is, the cells are rearranged to provide a new, jumbled, sequence of cells that obscures the original audiovisual data. Recording the cells in the jumbled sequence means that a reverse engineer cannot easily recreate the original audiovisual data from the cells. Knowledge of a correct sequence instruction is also required, in order to correctly reproduce the original content sequence.

One aspect of the present invention concerns addition of one or more erroneous "red herring" cells, which are not proper to an original content sequence.

In one exemplary embodiment the present invention provides a method for use in creating an audiovisual product, comprising the steps of: receiving original audiovisual data intended for playback according to an original content sequence; dividing the original audiovisual data into a plurality of cells of correct audiovisual data; adding at least one erroneous cell containing erroneous audiovisual data to the plurality of cells; and forming a sequence instruction representing a playback sequence for playing back selected ones of the plurality of cells in a specified order.

In another exemplary embodiment the present invention provides a method for use in reproducing an audiovisual product, comprising the steps of: receiving an audiovisual product having audiovisual data divided into a plurality of cells, including at least one correct cell containing correct audiovisual data proper to an original content sequence, and at least one erroneous cell containing erroneous audiovisual data, and at least one sequence instruction representing a playback sequence for playing back selected ones of the plurality of cells in a specified order; and reproducing the audiovisual data in the cells according to the sequence instruction.

Preferably, an erroneous red herring cell contains a short section of original audiovisual data and initially appears to be proper to the original content sequence, but the audiovisual data is distorted such as by playing the video data backwards. Hence, if the erroneous red herring cell is reproduced, then the original content sequence is not seen correctly. Other examples of erroneous cells include distracting visual or audio effects such as negative images, high contrast or low contrast images, snow, fading, jitter, and overly loud, soft or distorted audio, amongst many others.

Still another aspect of the present invention relates to the use of scrambled video streams within an audiovisual product.

In one exemplary embodiment of the present invention there is provided a method for use in creating an audiovisual product, comprising the steps of: receiving original audiovisual data intended for playback according to an original content sequence; dividing the original audiovisual data into a plurality of cells; allocating the plurality of cells amongst at least a first video stream and a second video stream; and creating a video stream switch instruction to switch between the first and second video streams, thereby reproducing the cells according to the original content sequence.

In another exemplary embodiment of the present invention there is provided a method for use in reproducing an audiovisual product, comprising the steps of:

receiving an audiovisual product having a plurality of cells of audiovisual data which together represent an original content sequence, wherein the cells are divided amongst at least first and second video streams; and performing one or more video stream switch instructions to automatically switch between at least the first video stream and the second video stream during reproduction of the cells, thereby reproducing the audiovisual data according to the original content sequence.

Original audiovisual data intended for playback according to an original content sequence is divided into a plurality of cells, and the cells are allocated amongst at least first and second video streams. A video stream switch instruction is used to automatically switch between the first and second video streams, thereby reproducing the cells according to the original content sequence.

Preferably, a video object holds each cell, and the video stream switch instruction defines a video stream to be reproduced from the video object as either the first video stream or the second video stream. Erroneous data is ideally recorded in the other streams. At least one preliminary video object has program instructions for performing the video switch instruction to select either the first video stream or the second video stream, respectively, and then a multi-angle video object holds the cell in a respective video stream. The preliminary video objects and the multi-angle video objects are suitably interleaved. That is, one or more preliminary video objects are reproduced in sequence, followed by one or more multi-angle video objects, and then repeating this layout. The video stream switch instruction is preferably performed using forced activate button commands associated with hidden menu buttons. The button commands are suitably taken from a DVD-Video virtual command set in order to set a video stream special parameter (i.e. SPRM3) to a desired video stream appropriate to the next multi-angle video object.

Preferably, a sequence generator is used to generate a sequence of video streams in order. The sequence generator is preferably a deterministic algorithm seeded by one or more initial parameters. In one preferred embodiment, one or more of the initial parameters are provided again at playback, as a form of key.

The preferred embodiments of the present invention relate in particular to an audiovisual product playable according to a DVD-Video specification. Preferably, a sequence instruction is implemented as a program chain (PGC). It is desired to provide effective control of access to audiovisual data contained in a DVD-Video product, but also to maintain efficient use of available space on a recording medium such as an optical disc. The bulk of the data on a typical DVD-Video disc is taken up by audio-video presentation data, which is contained within cells and video objects (VOBs). By contrast, the space taken up by navigation data, such as programs (PGs) and program chains (PGCs) is relatively small.

Each of the aspects of the present invention as discussed herein can be employed alone. Preferably, any two or more of the aspects of the present invention are employed in combination. Most preferably, the locking aspect, the obfuscation aspect and the content scrambling aspects disclosed herein are all employed in combination.

In one particularly preferred embodiment of the present invention, an original content sequence is divided into cells, and the cells and/or the video streams are scrambled. Hence it is difficult for the original content sequence to be reconstructed simply by reading the audiovisual objects in the audiovisual product. Further, a correct sequence instruction is hidden amongst many similar but incorrect sequence instructions. Further still, access to the correct sequence instruction is controlled by a destination function and an access code. As a result, a very high degree of security is obtained for the original audiovisual data stored in the audiovisual product.

The present invention also extends an audiovisual product formed by or adapted for use in any of the aspects of the present invention as defined herein. The audiovisual product is preferably a DVD-Video product and particularly an optical disc having audiovisual content recorded thereon according to a DVD-Video specification.

Conveniently, in at least some preferred embodiments, the present invention is implemented as a computer program, or a suite of computer programs. The program or programs are recorded on any suitable recording medium, including a removable storage medium such as a magnetic disk, hard disk or solid state memory card, or as a signal modulated onto a carrier for transmission on any suitable data network, such as a local area network (LAN) or a wide area network (WAN) such as the internet.

In at least some preferred embodiments, the present invention is suitably performed on a computing platform, ideally a general purpose computing platform such as a personal computer, or a client-server computing network. Alternatively, the present is implemented, wholly or at least in part, by dedicated hardware. As one example, the present invention is performed in a home entertainment appliance such as an optical disk player or recorder.

In at least some preferred embodiments, the present invention is performed in a DVD-Video player for playback of DVD-Video format optical discs and/or in a DVD-recorder for recording DVD-Video format data onto an optical disc.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 12 shows the cells being jumbled;

FIG. 13 shows reallocation of references to the cells;

FIG. 14 shows an example correct playback sequence instruction;

FIG. 21 is a table of an example sequence generator function;

FIG. 22 is an example of DVD virtual commands used to perform video stream switching.

DETAILED DESCRIPTION OF THE PREFERRED EMBODIMENT AND BEST MODE

The preferred embodiment of the present invention will be described with reference to the particular example of a DVD-Video format optical disk containing audiovisual content. However, it will be appreciated that the invention is applicable to a wide variety of other environments, particularly where audiovisual content is stored in some form of random access storage media. Also, it is envisaged that the DVD-Video format will itself be superseded over time and replaced with new format definitions. That is, the present invention is likely to be applicable even in some future and as yet unrealised environments.

Figure 1:
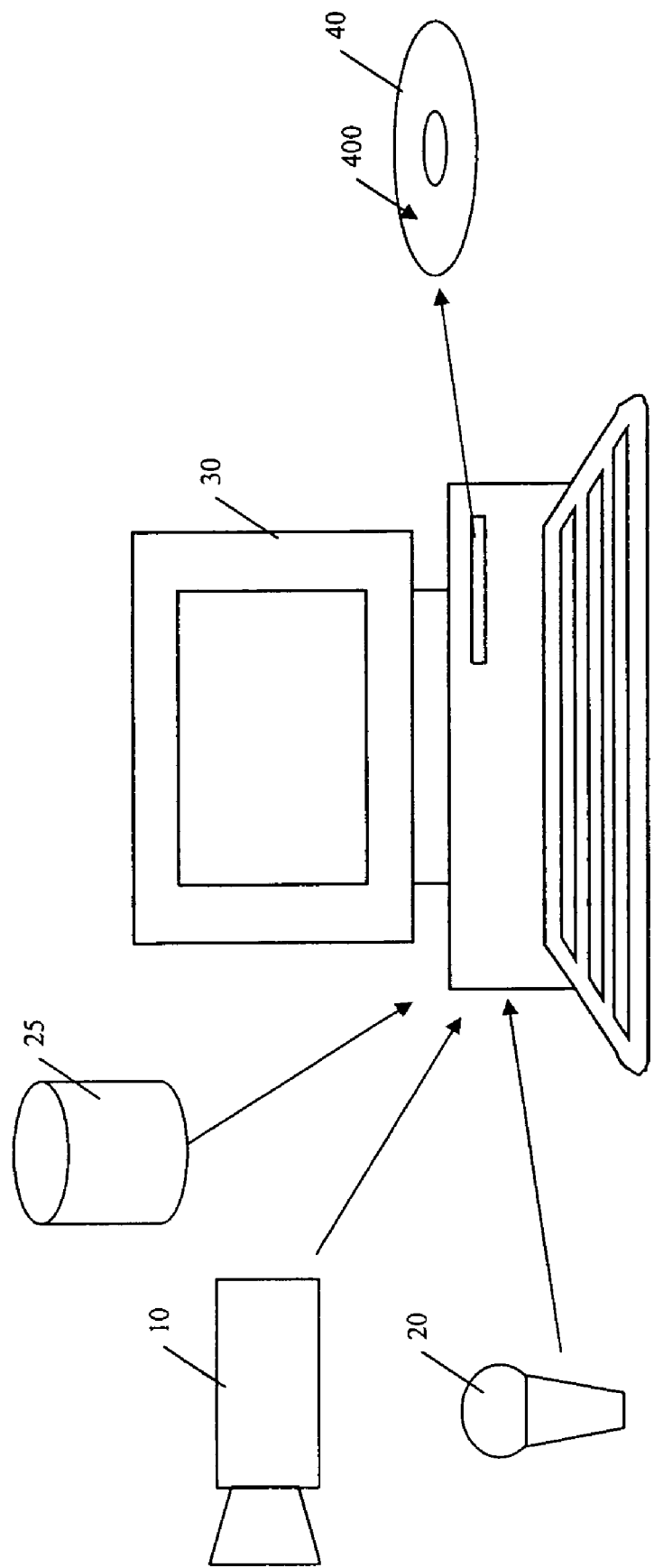
FIG. 1 is a schematic view of an apparatus for creating an audiovisual product, as used in preferred embodiments of the present invention.

FIG. 1 shows an example authoring apparatus as may be employed in preferred embodiments of the present invention. In this embodiment, the authoring apparatus includes a computing platform such as a client-server computer system, or a stand-alone personal computer 30. Optionally, raw audio and video data are received, such as through a camera 10 and a microphone 20, or are provided from other sources such as a file storage device 25, or are created within the authoring apparatus such as by image and sound creation software. The raw content data may include video clips, audio clips, still picture images, icons, button images and other visual content to be presented onscreen. The content is suitably in the form of MPEG or JPEG encoded files, but may take any suitable format.

This original audiovisual data can take any form such as a movie, or a company presentation, or a quiz game, amongst many other possibilities. The personal computer 30 acting as the authoring apparatus creates the desired audiovisual product as will be discussed in more detail below. The authoring apparatus 30 writes the audiovisual product 400 onto a storage medium such as a hard disk drive within the personal computer 30 or onto an optical disk 40.

Figure 2:
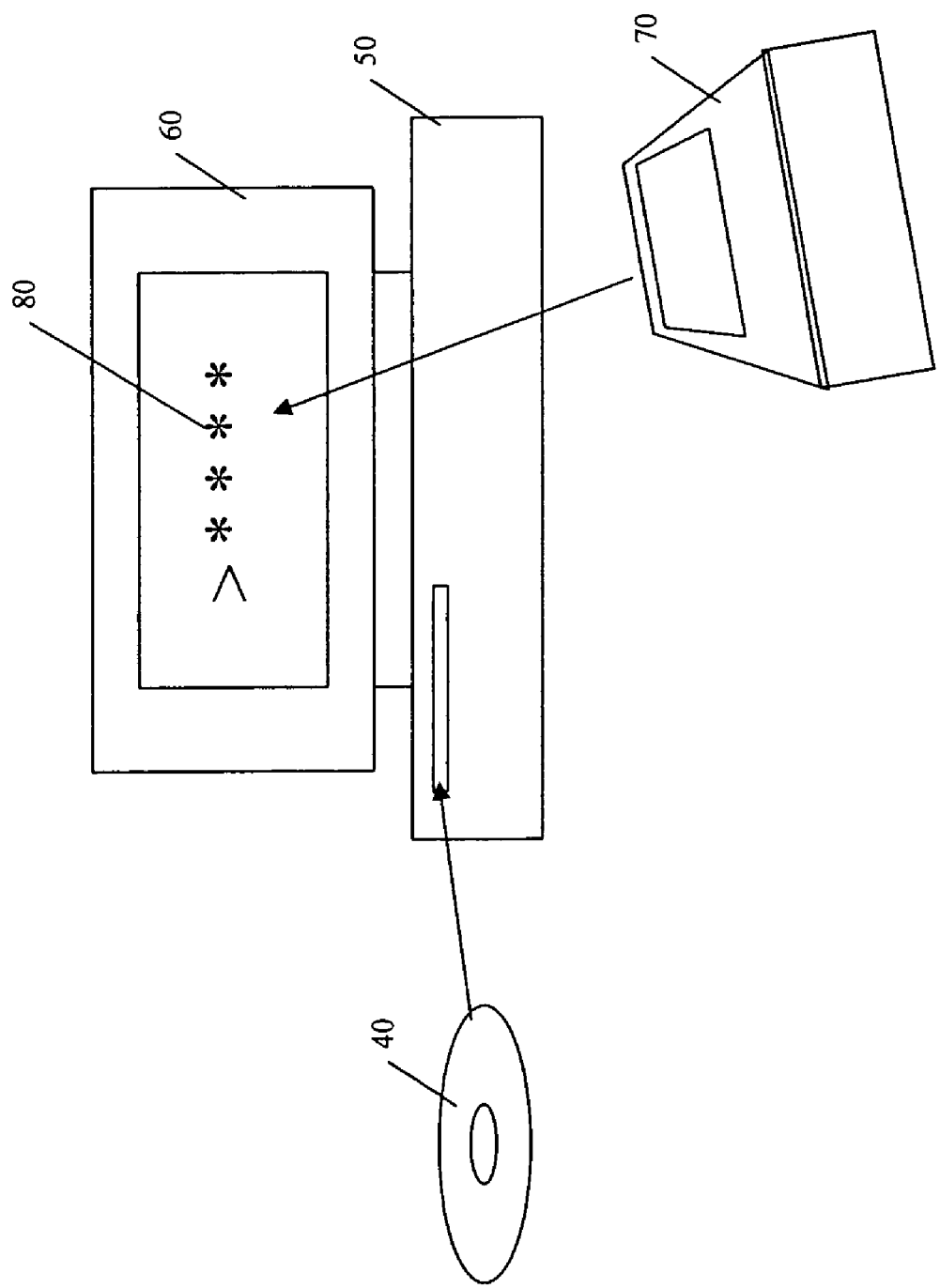
FIG. 2 is a schematic view of a playback apparatus for reproducing an audiovisual product as employed in preferred embodiments of the present invention.

FIG. 2 is a general overview of an apparatus for reproducing the audiovisual product 400, as may be employed in preferred embodiments of the present invention. The audiovisual product 400 on the optical disk 40 is received into a playback apparatus, in this case including a DVD player 50 and television screen 60. User controls are provided such as through a remote control handset 70. As will be explained in more detail below, in one example embodiment, the audiovisual product 400 is controlled according to user input of an access code or PIN-code 80. As shown in FIG. 2, the access code 80 is presented on the television screen 60 in response to user inputs through the remote control apparatus 70.

Figure 3:
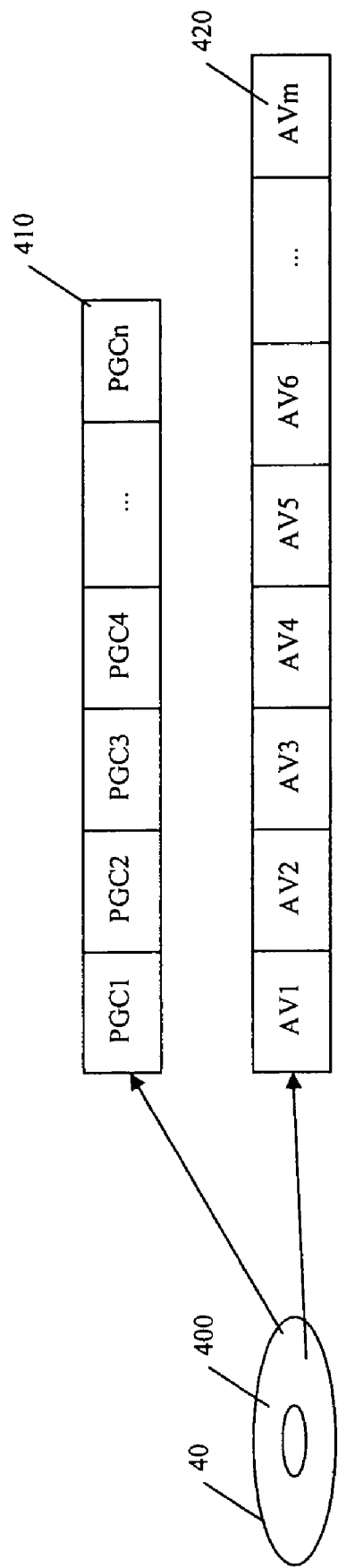
FIG. 3 is a schematic representation of an optical disk recording medium and data recorded thereon, according to a preferred embodiment of the present invention.

FIG. 3 shows a structure of the audiovisual product 400 in more detail. The audiovisual product 400 includes a plurality of cells 420, in this case represented by cells AV1, AV2 ... AVm. Each cell 420 contains a short section of audiovisual data. The cells are played in sequence, typically one after the other, in order to deliver the intended audiovisual representation, under control of a playback sequence instruction 410. The sequence instructions 410 as shown in FIG. 3 are separate from the cells 420. Suitably, the cells 420 and the sequence instructions 410 are each allocated to structure locations within the audiovisual product, so as to enable navigation between instructions 410 and from instructions 410 to cells 420.

In the preferred example of DVD-Video format data, the cells 420 are played in sequence through their inclusion by reference in programs (PGs) which are in turn organised into Program Chains (PGCs). In FIG. 3, the sequence instructions 410 are represented by Program Chains PGC1, PGC2 . . . PGCn. Preferably, each cell 420 contains at least one video stream, at least one audio stream, and/or at least one sub-picture stream.

The DVD-Video format permits a many to one mapping from PGCs to cells, which is primarily designed in the specification in order to support multiple story lines. An example of this is a DVD-Video disc that contains two separately rated versions of the same movie corresponding to a PG version and a G (General Audience) version, with the latter having certain scenes removed. When a viewer plays the disc, he or she can select at the outset whether to play the PG or G version, and a 'parental control' feature of DVD is available for exactly this purpose. Typically, most of the movie content is common to both the PG and G versions and recorded only once on the disc. However, the PGC for the PG version omits selected scenes which are included only in the PGC for the G version, or vice versa.

Since the bulk of the data on a typical DVD-Video disc is taken up by audio-video presentation data contained within the cells 420, and the space taken up by presentation data including PGCs 410 is relatively small. The present invention implements multiple variations on the way in which those cells 420 are played, but without duplicating the audio-video data.

Obfuscation of Sequence Instructions

In a first aspect, the present invention provides an audiovisual product where a correct playback sequence instruction is obscured amongst many incorrect sequence instructions.

The preferred embodiment of the present invention provides obfuscation by using multiple PGCs 410 to reference the underlying cells 420 in multiple different sequences, but where only one such sequence is correct.

Figure 4:
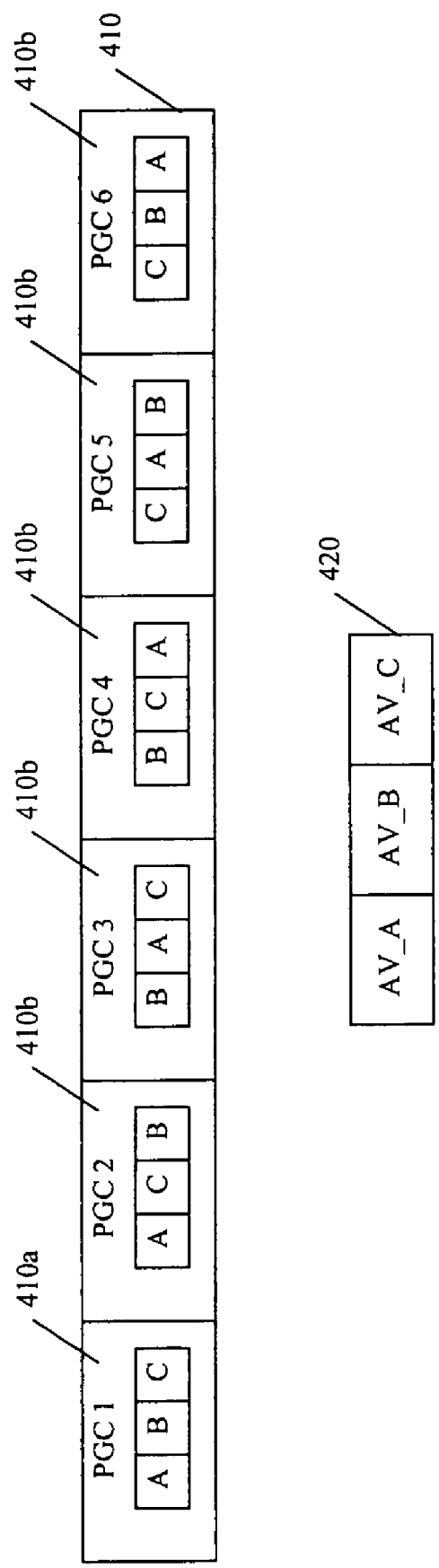
FIG. 4 is a schematic view of PGC permutations used in a preferred embodiment of the present invention.

For example, for three cells A, B and C, six PGCs 1-6 may be defined as shown in FIG. 4. In this case there are six possible playback sequences of the content, of which only PGC 1 provides a correct playback sequence. Hence, PGC 1 is a correct sequence instruction 410a, whilst the other PGCs 2-6 are all incorrect sequence instructions 410b. This approach can be taken to hide the correct video sequence. For this purpose, the duration of the cells 420 should be quite short (a cell can contain as little as 0.4 seconds of audio/video) and the video programme should be divided into a large number of cells 420. In the DVD-Video specification, a PGC can contain up to 256 cells, and a Video Title Set (VTS), which is the enclosing structure for PGCs, may contain up to 32767 PGCs. Thus, a cell may be shared by at most 32767 PGCs. In the example above it is assumed that the correct sequence, A, B, C, consists of sequential cells 420 played back in order.

Figure 5:
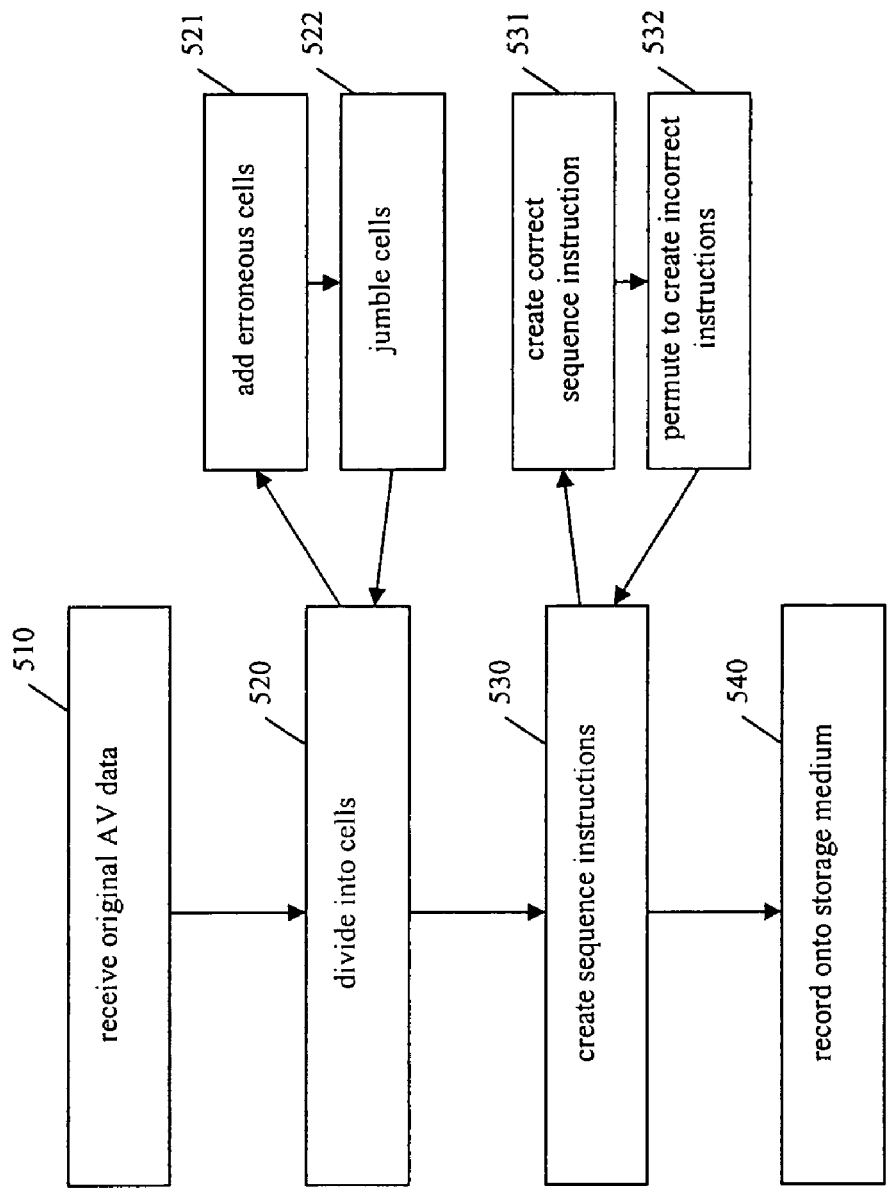
FIG. 5 is a schematic flow diagram of a preferred method of creating an audiovisual product.

FIG. 5 is an overview of a preferred method for creating an audiovisual product. Raw audiovisual data is received at step 510. At step 520, the audiovisual data is divided into cells 420 as outlined above with reference to FIG. 4 and as discussed in more detail below. The step 520 may include the step 521 of adding erroneous cells into the original audiovisual data. The step 520 also optionally includes the step 522 of scrambling (rearranging or jumbling) the cells 420 so that they do not correspond to the original intended playback sequence.

Step 530 comprises creating a plurality of sequence instructions 410 which control a playback sequence of the cells 420 created in step 520. The step 530 includes the step 531 of creating one or more correct sequence instructions 410a, amongst other incorrect sequence instructions 410b. Step 532 optionally comprises permuting the correct sequence instruction 410a to create a larger number of incorrect sequence instructions 410b, so that the one or more correct sequence instruction 410a is hidden amongst the many incorrect sequence instructions 410b derived therefrom.

Having created the cells 420 of audiovisual data and the corresponding plurality of sequence instructions 410 in steps 520 and 530, the audiovisual product is then formatted and recorded onto a suitable storage medium in step 540. In the preferred embodiment the audiovisual product is formatted according to the DVD video specification and recorded onto a hard disk drive or preferably an optical disk. This step 540 may, if necessary, include downstream processing steps such as specific allocation of structure locations to the cells 410 and the sequence instructions 420, and creating an explicit disk image (i.e. a bitstream image) ready to be recorded or burnt onto an optical disk.

Figure 6:
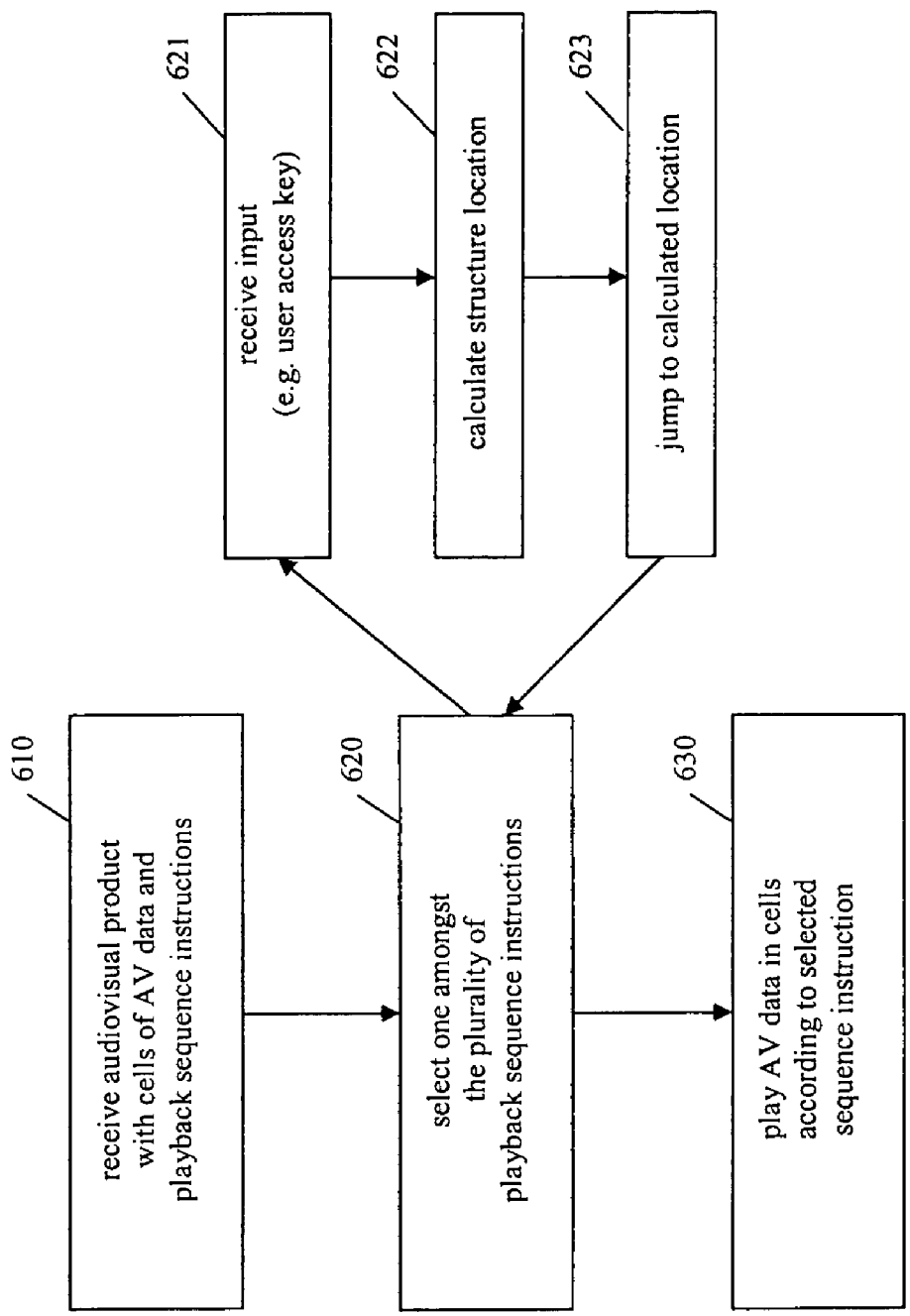
FIG. 6 is a schematic flow diagram of a preferred method of reproducing an audiovisual product.

FIG. 6 is a schematic overview of a preferred method for reproducing the audiovisual product 400.

Step 610 comprises receiving the created audiovisual product with the cells 420 of audiovisual data and the plurality of playback sequence instructions 410.

Step 620 comprises selecting one of the playback sequence instructions 410. Step 620 preferably includes the step of performing an authentication process to confirm that the user has permission to reproduce the audiovisual product. In one embodiment, authentication includes a step 621 of receiving a user input such as a user access code or PIN, calculating a structure location within the audiovisual product in step 622, and then jumping to the calculated location in step 623. Such calculation in step 622 suitably realises a structure location corresponding to one amongst the plurality of playback sequence instructions. If the calculation of step 622 has been performed correctly, then a correct playback sequence instruction 410a will be located. Otherwise, one of the many incorrect playback sequence instructions 410b will be selected.

Step 630 comprises playing the audiovisual data in the cells 420 according to the selected playback sequence instruction 410. Step 630 suitably includes retrieving the audiovisual data in the referenced cells 420 from a storage medium such as an optical disk, performing appropriate decoding, and rendering the decoded data for output such as through a display screen and through audio speakers, as outlined above with reference to FIG. 2.

PGC Obfuscation

A particularly preferred embodiment of the present invention will now be described by way of further illustration, with reference to FIGS. 7 to 17 of the drawings.

Figure 7:
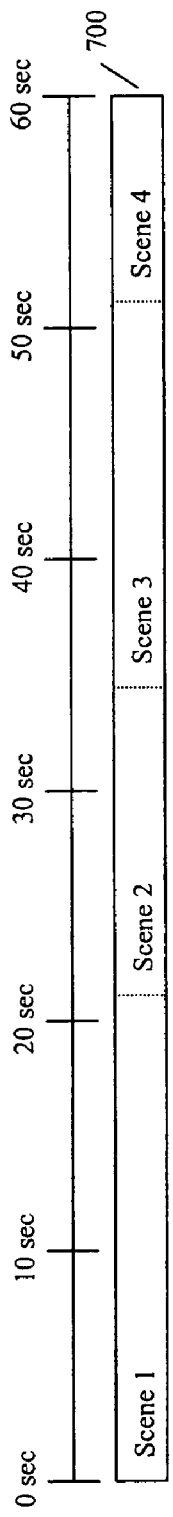
FIG. 7 is a schematic view of an example original audiovisual clip.

FIG. 7 shows an example audio-video film clip 700. Assume that the source video content that is required to be protected consists of a 60 second clip within which there are three 'cuts' such that the clip contains four distinct scenes. Note that the scene cut points are typically implicit within the clip, rather than being presented as four separate sub-clips.

It is desired that the sequence will be divided into cells 420 with an average duration of 3 seconds each, resulting in a total of 20 cells to represent the sequence.

Figure 8:
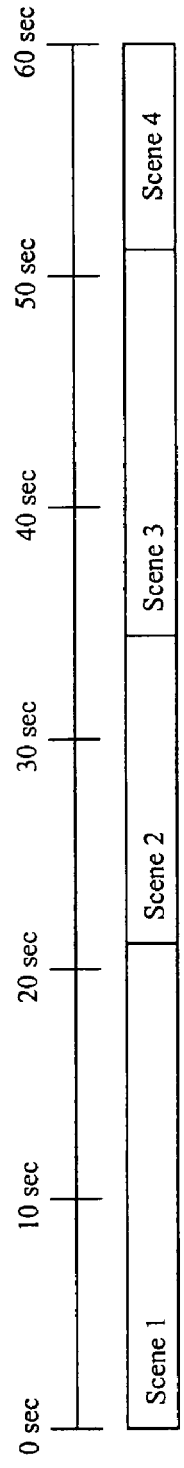
FIG. 8 shows the identification of scene cuts within the audiovisual clip.

The supplied video clip is searched for scene cuts. There are well-known methods used for this purpose based on discontinuities in the video and/or audio stream. See, for example, G. Akrivas, N. Doulamis, A. Doulamis and S. Kollias, "Scene Detection Methods for MPEG-encoded Video Signals", Proceedings of MELECON 2000 Mediterranean Electrotechnical Conference, Nicosia, Cyprus, May 2000, amongst many other. The scene cuts become anchor points for the subsequent subdivision, as shown in FIG. 8.

Figure 9:
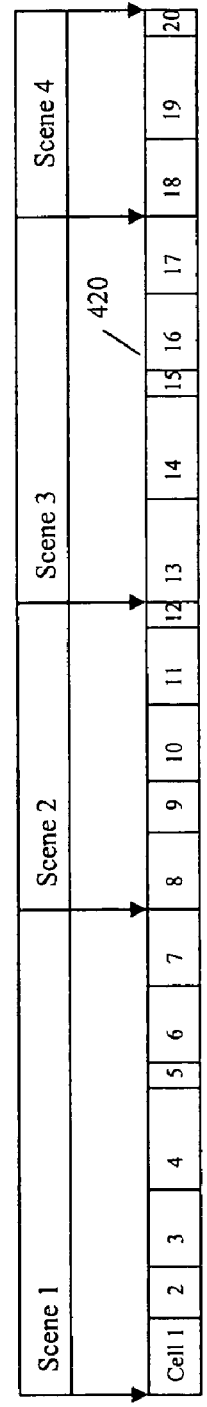
FIG. 9 shows the audiovisual clip subdivided into scenes.

As shown in FIG. 9, in this example the clip is divided into cells 420 of approximately 3 seconds each, with cells 420 anchored to the cut scene points. The duration of the cells 420 is altered slightly so that the resulting cells are not of a uniform duration.

Erroneous "Red Herring" Cells

Figures 10, 11:
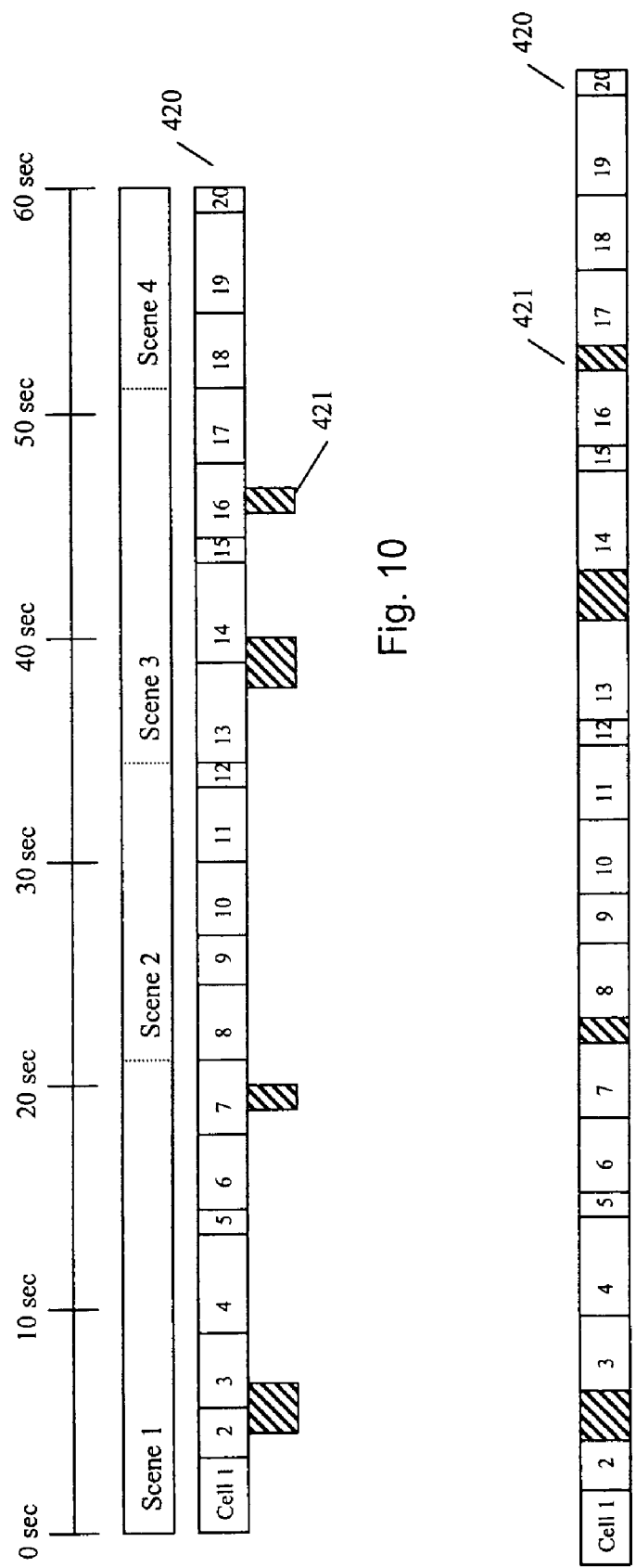
FIG. 10 shows the audiovisual clip divided into cells.
FIG. 11 shows red herring cells inserted into the cells.

Referring to FIG. 10, it is advantageous to incorporate erroneous 'red herring' cells 421 that are not referenced in the correct playback sequence 410a. (A 'red herring' is literally a distraction to divert attention, and derives from the use of fish to distract hunting dogs from a scent trail). Such erroneous cells 421 are suitably designed so that they appear very similar to correct cells 420, such that it is not possible to easily exclude all sequence instructions 410 that contain clearly incongruous cells 421. For example, suppose that the product includes a series of cells 420 of four seconds duration each, as follows:

Cell 1—start 0 secs end 4 secs
Cell 2—start 4 secs end 8 secs
Cell 3—start 8 secs end 12 secs In this case, some example erroneous cells are:

Red herring 1—start 2 secs end 6 secs
Red herring 2—start 6 secs end 10 secs

In practice, the duration of each cell is varied so as not to create a pattern from which, for example, interrogation of time codes could be used to discard obviously erroneous cells.

As shown in FIG. 10, a number of erroneous 'red herring' cells 421 are created, which have a similar length to the other cells 420. The level of protection will increase with the number of erroneous red herring cells 421, and will typically be constrained by the space available on the disc. In this example, 20% erroneous red herring cells are assumed. These erroneous red herring cells 421 ideally start and finish at points that are not shared by other valid cells, or at the point of scene cuts. The erroneous cells 421 are illustrated as shaded boxes in FIG. 10.

The erroneous red herring cells 421 are inserted into the play order of the valid cells 420, sorted by start time of the cell, as shown in FIG. 11.

Cell Scrambling

As shown in FIG. 12, the cells 420 (including any erroneous cells 421) are jumbled by changing the location of each cell relative to others, and so determine the order in which the cells 420 will be presented on the disc. Although the cells 420 may be jumbled arbitrarily, it will provide a higher level of protection if each possible playback sequence meets the constraints detailed in the DVD-Video specification that relate to seamless play. That is, for two cells 420 to play back seamlessly—without a jump during playback—then their associated data must be relatively close on the disc. In practice cells 420 may be many sectors apart and still play back seamlessly, so in this example the cells 420 may be sequenced arbitrarily, but for illustrative purposes we assume that any cell must be within three cells 420 of its correct position.

In the preferred DVD-Video format, the cells 420 are numbered from 1 in the order they appear on the disc. Hence, the jumbled cells 420 are renamed sequentially in the order they will appear on the disc as shown in FIG. 13, using an underscore to denote renamed cell identifiers.

Under the illustrated arrangement, the correct playback sequence is shown in FIG. 14.

Note that the cells 4, 8, 15 and 19 are erroneous red herrings and do not occur in the correct playback sequence.

Based on the list of cells 420 as provided on the disc, 1, 2, . . . 24, a number of incorrect playback sequences 410b are created, each one determined by selecting any 20 from the 24 cells and presenting these in a random order. Again, the level of protection will increase if every such sequence meets the DVD-Video specification's requirements for seamless playback. If the sequence is broken into N cells 420 with the addition of R red herring cells 421, then the number of possible sequences (ignoring the seamless playback constraints) is: $(N+R)!/R!$. In the current example, this equates to $24!/4!$ This number is very large ($2.6 \times 10^{22}$) and in practice the number of possible sequences presented on the disc is constrained by DVD-Video limits on the number of Program Chains (PGCs). Since the audio/video data is shared between PGCs, there is a practical limit of 32,767 playback sequences. Each playback sequence stores the playback cells 420 by reference, so each of these sequences can be represented on the DVD disc using very little data.

Figure 15:
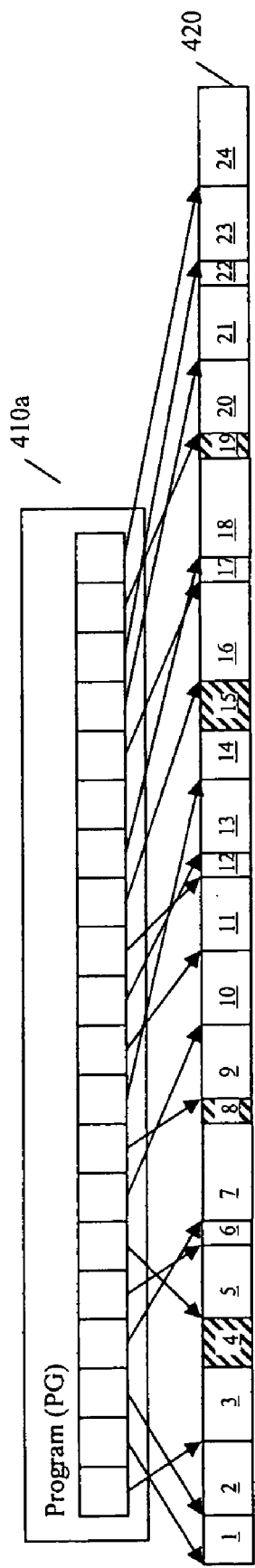
FIG. 15 shows a navigational Program of a correct playback sequence instruction.

Each of the playback sequences 410 (i.e. the correct sequence 410a together with multiple incorrect sequences 410b) is represented using the Program (PG) DVD-Video navigation structure. This consists of a list of cell pointers. Programs are contained within Program Chain structures. The Program corresponding to the correct sequence 410a in this worked example would be structured as shown in FIG. 15.

Figure 16:
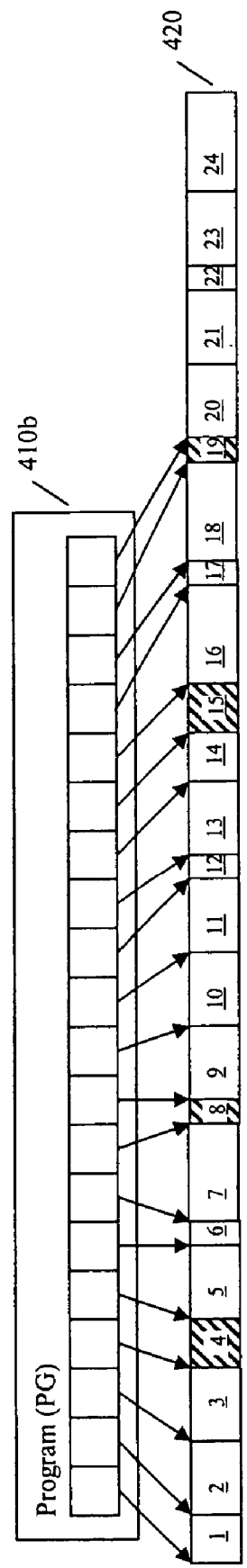
FIG. 16 shows a navigational Program of an incorrect playback sequence instruction.

An example of one incorrect sequence 410b, which consists of the playback sequence 1, 2, . . . 20, is illustrated by FIG. 16.

Figure 17:
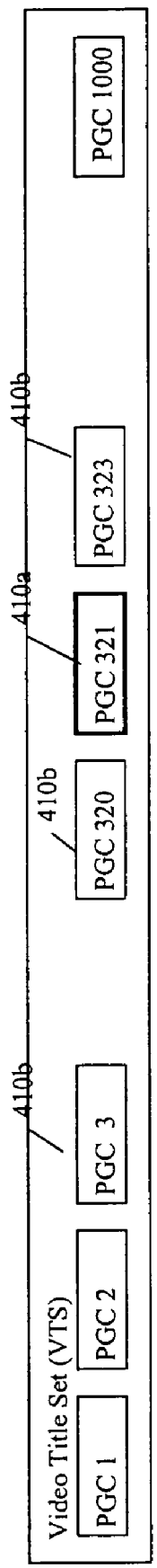
FIG. 17 shows a correct playback sequence instruction amongst many incorrect playback sequence instruction.

A Program Chain is created for each of the playback sequences within a single Video Title Set (VTS). Assume that there are 1,000 sequences in total created for the disc, of which one is the correct sequence and 999 are incorrect sequences. One of the sequence instructions 410a is chosen to be the destination to unlock the video, in this example, PGC number 321, which contains the Program with the correctly ordered sequence of cells 420, as shown in FIG. 17.

The audiovisual product is then ready to be recorded onto a suitable storage medium, in this case an optical disk. However, further intermediate authoring steps may be performed in order to convert the authored audiovisual product into a specific version, i.e. into a disk image ready for burning onto a blank previously unrecorded optical disk.

In order to extract the correct sequence of cells 420, a reverse engineer would need to examine every possible combination. Assuming that the maximum possible number of cells 420 has been encoded, then to reconstruct a one hour program would require a reverse engineer to view up to 32,767 hours (3.74 years) of content.

It is preferred when preparing the sections of video to ensure that there are no obvious clues to the correct sequence of cells 420. For example, any timecodes in the MPEG elementary streams should be removed so that this information cannot be used to sort a series of cells 420 into the required order. Also, cells 420 should be divided on scene boundaries so that a reverse engineer cannot simply compare the last frame in one cell with the first frame in another to guess the correct playback sequence.

To overcome the restriction of the number of PGCs per VTS, the method outlined above can be extended to employ multiple VTSs and therefore increase the number of destinations that must be interrogated in order to find the correct playback sequence. In this case, the video program would be divided into v sections of similar duration, with section 1 mapping to VTS 1 up to section v mapping to VTS v. Within each VTS up to 32767 PGCs can be used to obfuscate the program; the correct PGC in each VTS is unrelated and is arrived at through independent calculation.

Playback of the audiovisual product involves determining the correct playback sequence instruction amongst the many incorrect playback sequence instructions 410. In the above example shown in FIG. 17, this means determining PGC 321 as the correct playback sequence instruction 410a in order to achieve satisfactory playback of the audiovisual content, i.e. according to the cell sequence shown in FIG. 14 by reproducing cell 3, followed by cell 1, followed by cell 2 and so on. As will be appreciated by the skilled reader, various options are available to determine whether a user is authorised to access the audiovisual content. For example, a physical token such as a smart card is presented to a card reader, or some form of biometric authentication (e.g. fingerprinting) is performed. The playback apparatus is then instructed to operate according to the correct playback sequence instruction, suitably by jumping to a structure location associated with the correct playback sequence instruction.

Video Stream Scrambling

A further aspect of the present invention relates to scrambling of video objects within an audiovisual product, so that unauthorised access or copying of the audiovisual product is made more difficult.

The preferred embodiment relates to an audiovisual product which is playable according to the DVD-Video specification, and will be described in detail below.

The DVD-Video specification provides a structure known as a Video Object (VOB) to hold streams of audiovisual data. VOBs are internally divided into Cells, as also generally discussed above with reference to FIG. 4. An audiovisual program is presented by playing a series of the VOBs in a pre-defined sequence, using Programs and Program Chains (PGCs). In the current DVD-Video specification, VOBs contain from one to nine video streams (often referred to as "multi-angle" streams), from zero to eight multi-channel audio streams, and from zero to 32 sub-picture streams.

Consecutive VOBs can be ordered to contain different numbers of streams. For example, a first VOB may contain a single video stream, while a second VOB may contain four video streams. A VOB that contains multiple video streams is often referred to as a "multi-angle block". A Special Parameter (SPRM)—number 3 (SPRM3)—is used to stipulate which video stream to play. If the audiovisual product is recorded with this special parameter SPRM3 set to the value "4", then future multi-angle streams will result in angle 4 being selected for playback. This feature is designed to enable a viewer to choose between up to nine different camera angles and then to view the recorded video stream for the chosen camera angle. However, the present invention employs this camera angle video stream feature to provide improved protection against copying or unauthorised access of the audiovisual product.

Figure 18:
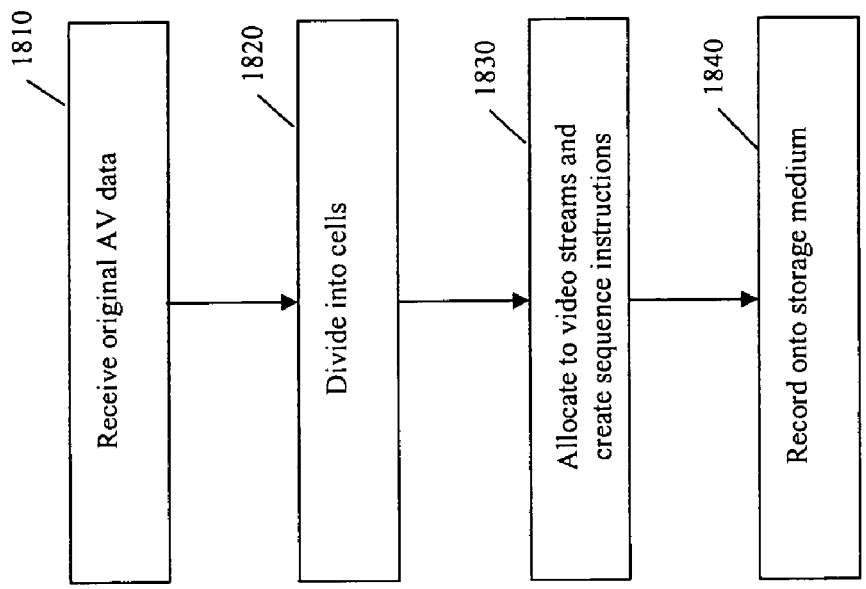
FIG. 18 is a schematic overview of a preferred content scrambling method using video streams.

FIG. 18 is an overview of a preferred method for scrambling content in an audiovisual product, using video streams. Original audiovisual data is received at step 1810, such as MPEG encoded audio and/or video data. The original audiovisual data 401 is divided into cells 420 in step 1820. The cells 420 are distributed amongst a plurality of video streams, in step 1830. That is, instead of the cells all remaining within a single video stream, the cells are instead distributed within at least two different video streams. Also, at least one video stream switch instruction is created, in order to automatically switch from a first video stream to a second video stream during playback of the audiovisual product. Step 1830 comprises creating sequence instructions 410 which control a playback sequence of the cells 420. The audiovisual product is then formatted and recorded onto a suitable storage medium in step 1840.

The method will now be explained in more detail, with reference to FIGS. 19 to 23.

Figure 19:
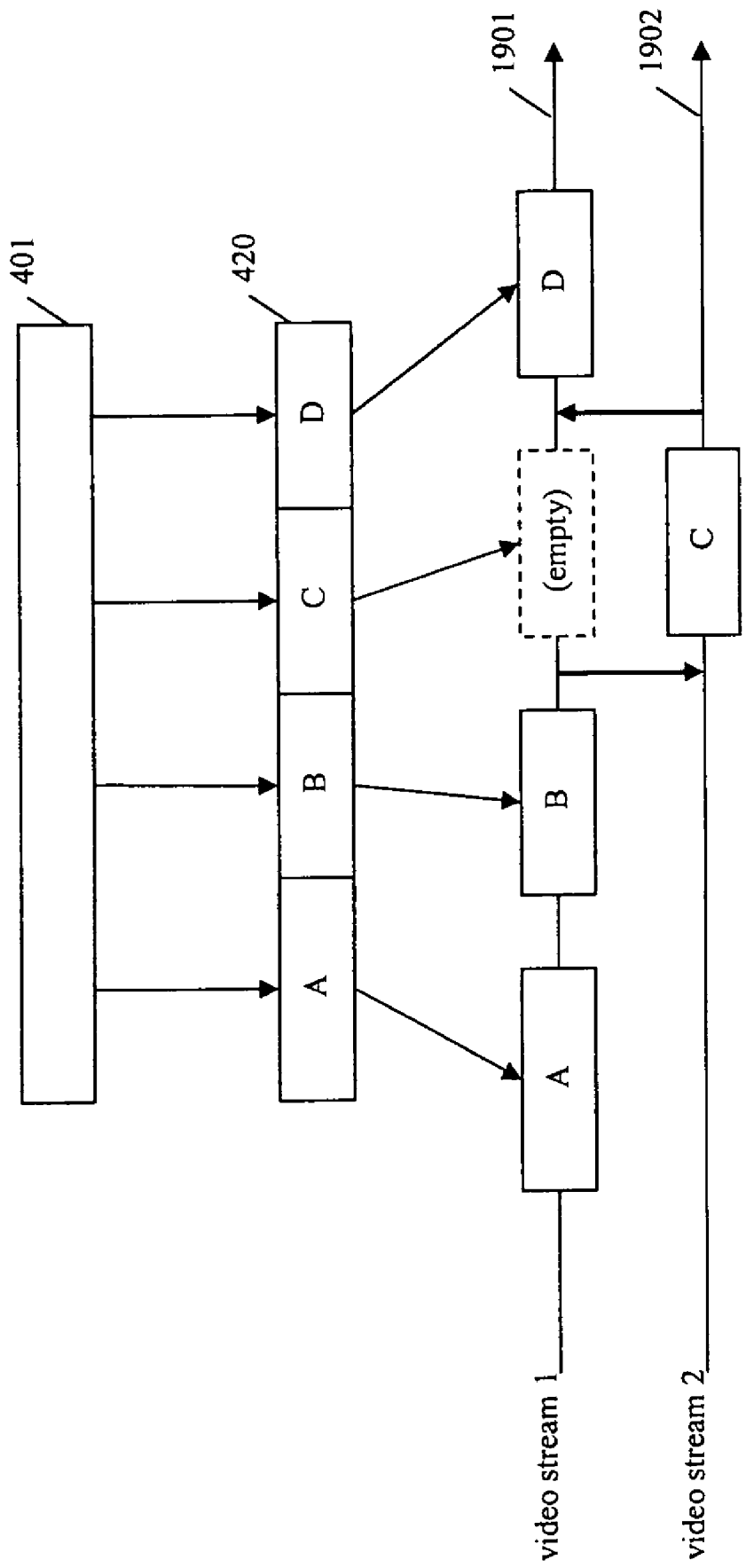
FIG. 19 is a schematic view of content data divided into cells and allocated to video streams.

As shown in FIG. 19, original audiovisual data 401 having an intended playback sequence (e.g. a generally linear storyline) is divided into a plurality of cells 420, similar to the discussion above with reference to FIGS. 7, 8 and 9. In this example there are four cells, labelled A, B, C and D. The cells are divided amongst different video streams. That is, some of the cells (A, B, & D) are allocated to a first video stream 1901, whilst at least one cell (C) is allocated to a different second video stream 1902. In order to play back the cells 402 in the desired sequence (ABCD), a video stream switch is required between the first stream 1901 and the second stream 1902. Simply continuing with the first stream 1901 does not result in the desired playback sequence. In this example, simply continuing with the first video stream 1901 would omit reproduction of cell C. The video stream switch to include cell C is represented by a bold arrow in FIG. 19.

Figure 20:
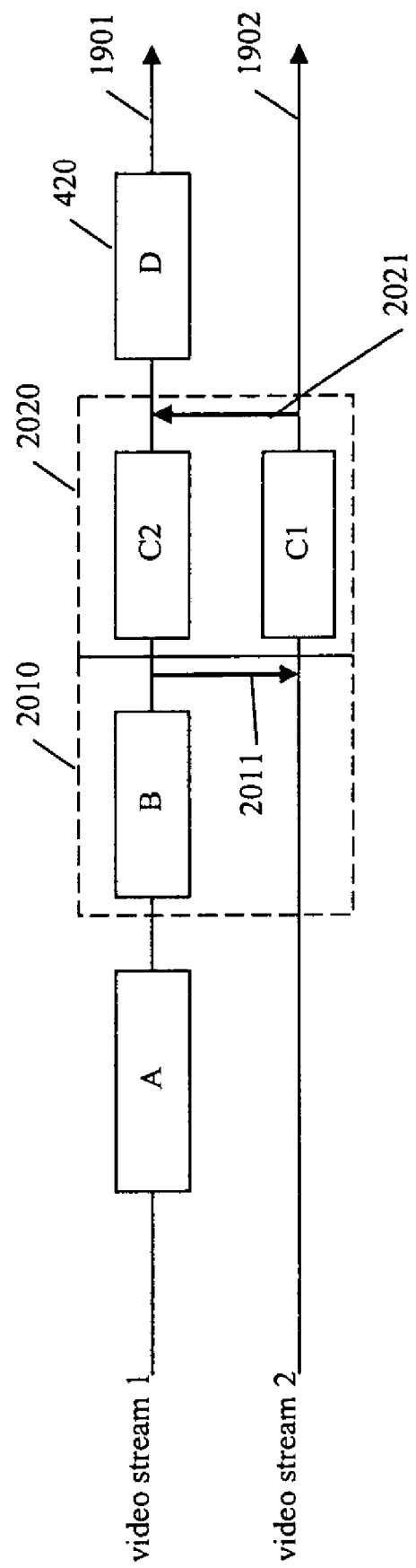
FIG. 20 is a schematic view of video objects employed in the preferred content scrambling method.

FIG. 20 shows the use of video streams within video objects (VOBs) in more detail. Conveniently, the cells 420 are contained within video objects (VOBs). Some of the cells (A, B, D) are held within simple VOBs 2010 having only one video stream. However, at least one video object 2020 is defined having a plurality of video streams 1901, 1902. The second video stream 1902 is provided by forming such a multi-stream video object (multi-angle block). The cell C is held in the second video stream 1902 within the multi-angle block 1920.

In FIG. 20, the cell C is provided in both video streams 1901 and 1902 as cell C1 and cell C2. This makes copying more difficult, since both streams 1901 and 1902 contain apparently valid data. The cell C2 is preferably an erroneous "red herring" cell containing distorted or otherwise unsatisfactory video data. Reproducing cell C2 (i.e. continuing with the first video stream 1901) does not provide satisfactory reproduction of the original audiovisual data 401. Up to nine alternative video streams may be provided within each multi-angle block, including the correct cell C1.

A sequence instruction (PGC) is created to play back the VOBs 1910, 1920 in order, thereby reproducing the cells 420 ABCD. The playback sequence is further controlled by video stream switch instructions 2011, 2021 to switch between video streams 1901, 1902 at appropriate points in the sequence. The correct video stream 1901, 1902 is calculated for each multi-angle block 2020, using a deterministic algorithm. When the same deterministic algorithm is employed during reproduction, playback then follows the same path amongst the recorded video streams.

In the preferred embodiment, the video stream switch instructions 2011, 2021 are performed using forced activate button commands associated with hidden menu buttons in a video object 2010 which precedes one of the multi-angle blocks 2020. In this example, the VOB for cell B includes a switch command 2011 to set the SPRM3 special parameter to "2". Upon entering the following VOB for cell C as a multi-angle block, the set value of the special parameter SPRM3 determines that stream "2" is to be reproduced, in this case leading to cell C1. Also, in this example, the VOB 2020 for cell C likewise sets SPRM3 to a value of "1" ready for a following cell.

The preferred embodiment uses a sequence generator to determine the correct video stream playback sequence. One appropriate sequence generator is based on a deterministic algorithm that is seeded by one or more initial parameters, and from which successive values are produced by applying the generator to the set of parameters. An example of such a sequence generator is a Linear Congruential Generator (LCG), defined as a method whereby the next number is generated from the current one by $r_{n+1}=(A*r_n+B) \mod M$, where A and B are prime numbers.

FIG. 21 is a table as an example of a short sequence provided by the values A=7, B=3, M=17. If each multi-angle block contains (say) four video streams, then the value $r_n$ modulo 4+1 (which returns values in the range 1 to 4) is used as the basis of selecting successive angles. Thus, in the first multi-angle block 2020, angle stream 1 will play, followed by angle 4 in the second block, and so on.

The original audiovisual data will only play back correctly if the original cell is played for each of the multi-angle blocks, for which it is necessary to know the values of the parameters to the sequence generator (A, B and M in this example). Since there are many possible values for these parameters, one or more of the parameters can be used as a 'key' to unlock the content. If incorrect parameters are chosen for playback, then incorrect video sequences will play during the multi-angle blocks, which will render the content unplayable (i.e. highly unsatisfactory).

That is, the method includes creating a deterministic algorithm having an iterative sequence of outputs dependent upon initial parameters, and determining the video angle streams according to the sequence. Also, the method includes receiving one or more parameters during playback of the audiovisual product, applying a deterministic algorithm to the parameters to produce a sequence of outputs, and selecting between video streams according to the produced sequence.

FIG. 22 shows example DVD-Video navigation instructions to perform the iterations of the LCG algorithm described. Under current implementations of the DVD-Video specification, only a single command can be associated with a menu button. Therefore to perform the necessary sequence of instructions in each iteration of the sequence generator, it is preferred to employ forced activate buttons in a number of successive cells, prior to encountering a multi-angle block. That is, the program is in practice executed using instructions performed at the end of each of several preliminary VOBs in sequence, interleaved between each multi-angle block. Following this sequence, the Special Parameter SPRM3, which records the number of the video angle for playback, is set to the appropriate value.

Figure 23:
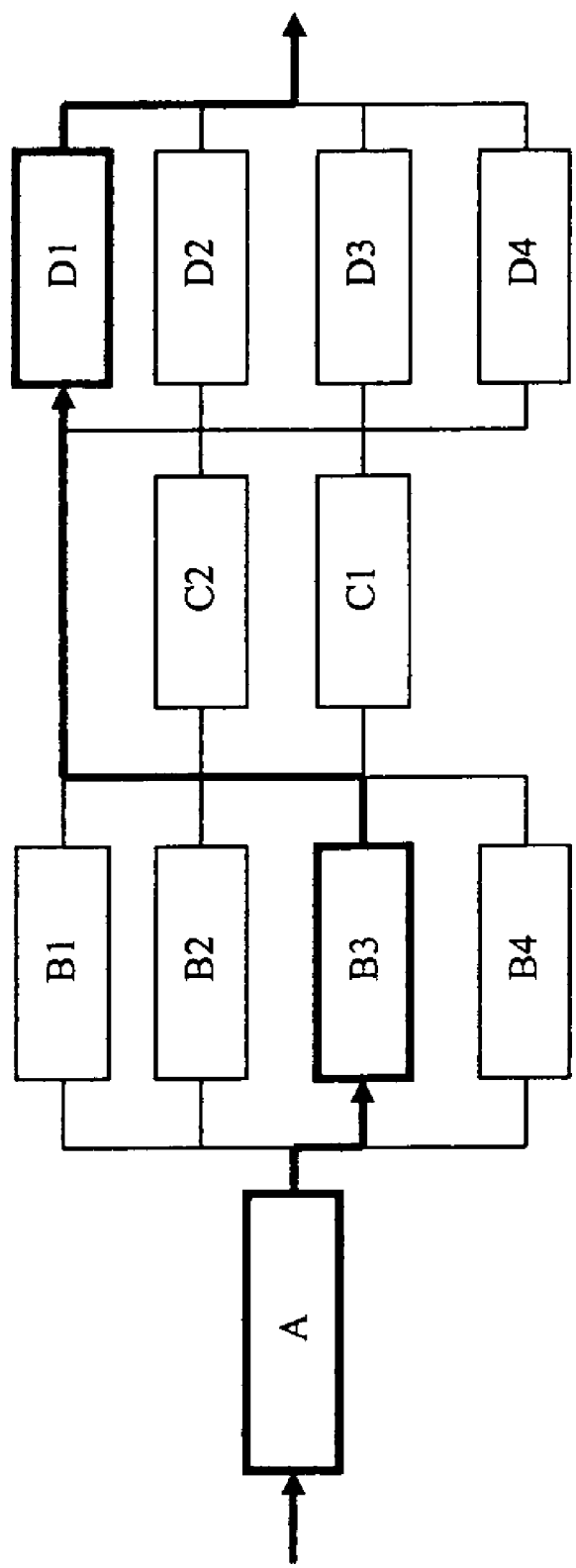
FIG. 23 is another schematic view of content data divided into cells and allocated to video streams.

FIG. 23 is a simplified example to illustrate the principle features of the preferred scrambling method. The cells C1 and C2 are completely erroneous and have been added to the original content sequence as "red herring" cells, as in the embodiment described above with reference to FIG. 10. Similarly, the cells B1, B2, B4, D2, D3 and D4 are all erroneous cells. The original audiovisual data is only reproduced by following the path shown in bold, which connects cells A, B3 and D1. This path requires the correct sequence instruction (PGC) to select these VOBs in order, and further requires the correct video stream switch instructions to select the appropriate stream within each multi-angle VOB. This synergistic combination leads to an audiovisual product having very strong defences against unauthorised access such as copying or viewing.

Locking/Unlocking

Another aspect of the present invention relates to "locking" of the audiovisual product, which then requires "unlocking" before a user is allowed access to the audiovisual product.

In a preferred embodiment of the present invention, the user provides an access code through an input device such as a keyboard or handheld remote control unit. Conveniently, the audiovisual product is provided with a start up sequence (e.g. first-play PGC) which prompts the user for input of the access code. The access code then leads, either directly or indirectly, to the correct program sequence instruction of PGC 321.

This further embodiment of the present invention has been developed to allow vendors to publish video content on DVD-Video discs for playback on any DVD-Video player, where the content must be 'unlocked' prior to viewing. This enables, amongst other things, pay-to-play applications, as illustrated by the following scenario:

1. An end user receives a DVD-Video disc containing valuable content, such as a cover-mount on a magazine.
2. When the user plays the disc, he/she is prompted to enter an 'unlock code' before the content or part of the content can be played.
3. To obtain the unlock code requires the user to call a premium-rate number or perform a credit card transaction, for example.
4. When the unlock code is entered on screen as the disc is playing, protected content becomes playable.

A number of variants are possible, according to the level of security and functionality that is required, as outlined below.

EXAMPLE 1

In a first example method, a single, fixed unlock code is used to unlock the disc content. This could be, for example, a four digit PIN. On screen, the user may be presented with an image of a numeric keypad and using the remote control navigation buttons (e.g. Up, Down, Left, Right and Enter) can key in the four digits. Preferably, as each digit is entered it is displayed on screen for confirmation to the user. Of course, many other input options are also applicable.

EXAMPLE 2

A characteristic of the first example method is that every user receives the same unlock code, and therefore a security weakness is that the unlock code could be given by one person to many others who would thereby subvert the access control. Using a pair of codes can enhance security as follows:

1. When prompting for the unlock code the disc displays an 'identification code' which could be, for example, a four-digit code chosen at random by the player at run time.
2. When the user purchases the unlock code he/she must first quote the identification code; for each possible identification code there is a corresponding unlock code.
3. The user enters the unlock code to access the disc content.

Many algorithms are available for generating matching pairs of security codes, such as public/private key pairs.

A characteristic of the second example method is that a new identification code will be generated for each session of playing the DVD disc and unlock codes are unique to each identification code. This means that if the user purchases an unlock code it can only be used to unlock the content once (pay once, play once). This may be desirable for some applications (for example, competition entry, when a user should pay again each time he/she wishes to enter the competition), but may be undesirable in others. For some applications it is desirable to allow pay once, play many functionality.

EXAMPLE 3

The second example method can be modified to allow the identification code to be entered by the user using information that is either unique to that user or restricted to a small number of users. Examples are:

1. A 'customer number' allocated to the user which can be traced (suitable for corporate use, for example).

2. A credit card number of the customer (which the customer is unlikely to circulate to others).

Dependent upon the level of security required, these various options for receiving an access code or unlock code can be employed alone, or in any combination. The access control and content security provided by the present invention allows audiovisual products to be defined and produced in many exciting and commercially valuable forms which are at present not possible. Some examples are given in the following table:

TABLE 1

| Application | Example | Security Required |
| --- | --- | --- |
| Drip Feed - A disc is delivered to users and content is unlocked at certain time intervals. | A newspaper publisher provides a disc with the paper on Monday containing a number of episodes. An access code is published each day of the week that unlocks a new episode to be viewed. | Security level is relatively low - it is not critical if a reader should discover early how to view episodes that are not yet on general release. |
| Reward - Content is unlocked if the user performs certain tasks. | A disc contains some kind of puzzle. When the puzzle is completed successfully, the reward is a video sequence. | Low. |
| Pay to Play - Content is unlocked when the user performs a transaction (perhaps pays a fee). | A disc contains a bonus episode. The user makes a credit card payment to obtain a code to access the content. | Medium. Unauthorised access would lead to loss of revenues, but the publisher would not be exposed to further costs. |
| Skill with Prize - A prize is awarded following the user performing certain tasks. | The disc contains a competition, such as a quiz, and based on the user's response a prize may be claimed by the user. | Medium/High. Payment of prize exposes the publisher to additional cost and risk. |

During playback, the content on the DVD-Video disc will cause the player to undergo authentication and will either play valid video if authentication succeeded or some other video if it failed.

EXAMPLE 4

To support the preferred embodiments of the present invention, certain steps are taken during the preparation of content for the disc (ie. authoring), and particular steps are taken during playback to unlock the content for authorised users.

During authoring, the disc content is prepared as follows:
1. Define a function D used to determine the destination on disc to play that meets the following requirements:
   a. D is parameterised by n values $C_1, C_2 \ldots C_n$ where each of these values corresponds to a separate access code component that together will be used for unlocking the content.
   b. The result of D when evaluated for all possible values should lie in the range 1 to m. Larger values of m will usually result in higher levels of protection of the content.
   c. The range of each code $C_i$ is such that, in combination $C_1, C_2, \ldots C_n$, there are a very large number of possible input values to D.
   d. There is a certain combination of values of $C_1', C_2', \ldots C_n'$ (the 'unlock code') that ideally results in a unique output from D, $D_{unlock}=D(C_1', C_2', \ldots C_n')$. If $D_{unlock}$ is not unique for all values $C_1, C_2, \ldots C_n$, (ie. there are multiple unlock codes), then ideally there should be as small a number of possible such combinations of values that result in $D_{unlock}$.

2. Create m destinations for program execution with the following properties:
   a. Destination $D_{unlock}$ corresponds to the unencumbered playback of the protected content.
   b. All other destinations result in playback of alternative or spurious content.

During playback of the disc the following steps are performed:
1. Obtain access codes $C_1, C_2, \ldots C_n$.
2. Determine destination $D(C_1, C_2, \ldots C_n)$.
3. Jump to destination.

The codes $C_1, C_2, \ldots C_n$ can be drawn from any of the examples given above, including any combination of the following:
1. A PIN number supplied to the user. This could take the form of a simple four-digit code, for example. A user interface provided on the DVD-Video disc provides prompts by which the user enters each of the four digits in turn. This may be provided by a visualisation of a numeric keypad with which the user must use the standard DVD-Video remote control buttons (up, down, left, right, OK) to select the sequence of digits.
2. A number that is specific to the current execution, which can be derived from the DVD-Video random number generator.
3. A number that is private to the user, such as a credit card number, or a customer code. This number would be entered in a similar way to item 1 above.

EXAMPLE 5

Various approaches are possible for definition of the destination function D. For example, a crude function would simply return a success/fail outcome based upon, say, a PIN number. The following pseudo-code returns 1 if the user enters the valid PIN code "1234" and 2 for all other codes.

```
Function D(C)
{
    if C = 1234 then return 1 else return 2
}
```

On the disc two destinations (1 and 2) would be set up, with 1 corresponding to the unlocked content proper, and 2 corresponding to some alternative content, such as a still image with the text "Access Denied". This approach would provide a very low level of protection—it would be trivial for a reverse engineer to identify both the correct unlock code and also the destination on disc for the protected content. The advantage of the approach is that it is very simple to implement, requiring simple authoring and playback methods. Therefore, this approach is adequate when security of the content is not an important requirement.

EXAMPLE 6

A slightly more secure approach is to use a one-way Hash function, which is a function H that maps a message M (usually of arbitrary length) to a fixed length 'message digest' where:

1. H(M) is easy to compute,
2. given any message digest MD it is hard to find a corresponding message M where MD=H(M); that is H is not practically invertible, and
3. given M and H(M) it is hard to find a message M'¹M such that H(M')=H(M).

Thus, a one-way hash function is a deterministic algorithm that compresses an arbitrary long message into a value of specified length—often referred to as a 'fingerprint'—such that it is infeasible to find two distinct messages that have the same fingerprint. Such functions are widely used in cryptography; popular methods include MD5, SHA and Snefru.

The significance of the one-way hash function is that, although a reverse engineer may be able to determine the required result of evaluating the function, there is no easy way to determine the input value that will give rise to that result.

A simple destination function D based upon a Hash function H is:

```
Function D(C)
{
    if H(C) = MD then return 1 else return 2
}
``` where MD is a pre-determined, constant Message Digest value defined as the result of evaluating H(C) for the correct unlock code. Since H is not invertible, it will not be easy for a reverse engineer to determine the value of C that will cause the destination function to jump to the locked content. However, it would still be relatively easy for a reverse engineer to substitute or eliminate the hash function above since the desired destination (namely, '1') is easy to determine from the code.

EXAMPLE 7

A more secure destination function would rely on having a relatively large number of apparently valid destinations available. For example, suppose a function D(C) takes as input a four-digit PIN code. A disc may be authored on which there are 10,000 possible destinations, of which 9,999 give "Access Denied" responses, and 1 results in the protected content. This can be accomplished by the following trivial destination function:

```
Function D(C)
{
    return C
}
```

Thus, security here is related to how easy it may be for a reverse engineer to identify the protected content amongst a large collection.

A security weakness then becomes the technique used to determine the code used to unlock the correct destination. In considering the pay-once, play-once scenario, it is important to ensure that a reverse engineer cannot easily purchase unlock codes and use these to allow play-many usages, thereby permitting the protected content to be extracted and transferred to a disc that does not require authentication.

EXAMPLE 8

Another example technique involves using a pair of keys as parameters to the destination function, with one key being generated by the player, and the second matching key being supplied by the vendor to unlock the content. One implementation of this approach may operate as follows:

1. The user plays the disc, which generates a random access code $C_1$ in the form, say, of a four digit PIN. The code is displayed on screen.
2. The user contacts the vendor and supplies the value of $C_1$.
3. The vendor supplies a matching code $C_2$, also, say, a four digit PIN.
4. The user enters $C_2$ into the DVD-Video player which internally causes a destination to be evaluated as $D(C_1, C_2)$.
5. The DVD jumps to the calculated destination.

Here, an example destination function is:

```
Function D(C₁, C₂)
{
    return (C₁ + C₂) mod 10000
}
```

In this case, the vendor-supplied code calculated at step 3 above would be evaluated as follows, assuming that the correct destination is $D_{unlock}$:

$C_2 = (D_{unlock} - C_1) \mod 10000$ (Note: $0 £ C_2 < 10000$)

For example, if the correct destination is 1234 and the DVD player presents a code of 5678, then the corresponding code required to unlock the content is (1234-5678) mod 10000=5556.

EXAMPLE 9

Another example by which the destination is unlocked is represented by the following pseudo code:

```
Ref = RND(10,000)          # Generate a random number 0... 9,999
Display Ref
Prompt for Key             # 'Key' is a 4-digit unlock key entered
                             by the user
Destination = (Ref XOR Key) mod 1000 + 1   # The target PGC in the
                                             range 1...1000
                                           Jump to PGC Destination
```

In the above, a random reference number is displayed. The user is required to contact the publisher of the disc to obtain a matching key. The publisher calculates this key as:

Key=D XOR Ref where 'D' is the correct destination—321 in this example. The user enters this key and a destination is calculated and execution jumps to the corresponding PGC.

Note that PIN codes above are used for illustrative purposes; in practice longer codes may be appropriate to provide high levels of security. The destination function illustrated is very simple and insecure; in practice a one-way hash function would be preferable so that it cannot be easily inverted.

The advantages of this method are:
1. The destination code cannot easily be determined from examination of the instructions on the disc,
2. each time the disc is played a different code will be generated requiring a distinct unlock code.

A disadvantage is that a reverse engineer who is aware of a matching pair of codes that unlock the disc could create a copy of the disc, and replace the instructions that generate the random number with instructions that always generate the known generated key. This new disc can then always be unlocked using the known unlock key from the matching pair.

EXAMPLE 10

Another enhancement of the method is to apply a non-invertible transformation to the true originating code $C_1$ in order to 'hide' this code. That is, the true originating code C1 acts as a seed to generate the first access code C1' displayed to a user. In which case, a modified implementation would be:
1. The user plays the disc, which generates a random access code $C_1$ in the form of, say, a four digit PIN.
2. A (non-invertible) transformation T is applied to $C_1$ to yield $C_1'=T(C_1)$ and this transformed code is displayed on screen.
3. The user contacts the vendor and supplies the value of $C_1'$.
4. Using a large, pre-calculated lookup table containing all possible codes and their corresponding transformed values, the vendor performs a table lookup to derive $C_1$ from the supplied $C_1'$.
5. Using the derived C, value the vendor obtains and supplies a matching code $C_2$, also, say, a four digit PIN.
6. The user enters $C_2$ which internally causes a destination to be evaluated as $D(C_1, C_2)$. (Note: the value $C_1'$ is no longer required).
7. The DVD jumps to the calculated destination.

The advantage of this method over the previous examples is that the exposed values C1' and C2 are not sufficient to unlock the disc content, but require the pre-transformed value C1 which cannot easily be derived from the exposed values. This is because, even though a reverse engineer could determine the method used by transformation T, this transformation is not invertible. The inverse transformation must be performed at the vendor's offices, where it is achieved through table lookup. Typically this table will be very large, and hence offers high security.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A method for use in creating an audiovisual product, comprising the steps of:
    receiving original audiovisual data intended for playback according to an original content sequence having a specific order;
    dividing the original audiovisual data into a plurality of cells;
    creating a plurality of sequence instructions, each representing a playback sequence for playing back the cells in a specified order, including;
        a correct first playback sequence for playing back the cells in an order sequence according to the original content sequence order;
        a plurality of incorrect second playback sequences, each if selected playing back the cells in an out of order sequence with the relative presentation order of at least two cells in the original content sequence not maintained, the out of order sequence presenting a viewer with a jumbled playback obscuring the original content sequence; and
    obfuscating the correct first playback sequence among the plurality of incorrect second playback sequences so that the correct first playback sequence is not self-evident, wherein the audiovisual product is protected as access to the original content is limited to a user able to select the correct first playback sequence.

2. The method of claim 1, wherein the dividing step comprises arranging the cells other than according to the original content sequence.

3. The method of claim 1, wherein the dividing step comprises adding one or more erroneous cells that are not proper to the original content sequence.

4. The method of claim 1, wherein the plurality of sequence instructions implement different variations on the way in which the audiovisual data in the cells are played, but without duplicating the audiovisual data itself.

5. The method of claim 1, wherein the plurality of sequence instructions are formed as a permuted sequence such that the incorrect second playback sequence instructions are permutations of the correct first playback sequence instruction.

6. The method of claim 1, comprising the steps of:
    providing a plurality of structure locations within the audiovisual product; and allocating the plurality of sequence instructions to the plurality of structure locations.

7. The method of claim 1, wherein the plurality of sequence instructions are formed as a plurality of Program Chains (PGCs).

8. The method of claim 1, further comprising:
    adding at least one erroneous cell containing erroneous audiovisual data to the plurality of cells.

9. The method of claim 8, wherein each erroneous cell has a start and finish point not shared with a start or finish point of the plurality of cells derived from the original content.

10. The method of claim 8, wherein the correct first playback sequence omits reference to the at least one erroneous cell.

11. The method of claim 8, wherein at least one incorrect second playback sequence includes reference to at least one erroneous cell.

12. The method of claim 8, wherein the erroneous presentation data comprises unplayable data.

13. The method of claim 1, wherein the audiovisual product is playable according to a DVD-Video specification.

14. The method of claim 1, comprising recording the audiovisual product onto a portable random-access storage medium.

15. The method of claim 1, comprising recording the audiovisual product onto an optical disk according to a DVD-Video specification.

16. The method of claim 1, wherein the cells are jumbled in their order of arrangement.

17. A method for use in reproducing an audiovisual product, comprising the steps of:
receiving an audiovisual product having a plurality of cells of audiovisual data which together represent an original content sequence having a specific order, the audiovisual product having a plurality of sequence instructions, the sequence instructions including a correct first playback sequence for playing back the cells in an order according to the original content sequence order, and a plurality of incorrect second playback sequences for playing back the cells in an out of order sequence with the relative presentation order of at least two cells in the original content sequence not maintained each incorrect out of order sequence if selected presenting a viewer with a jumbled playback obscuring the original content sequence order, the first correct playback sequence obfuscated among the plurality of second incorrect playback sequences so that the first playback sequence is not self-evident;
receiving an access code identifying the first correct playback sequence; and
reproducing the audiovisual data in the cells in the order according to the first correct sequence order thereby reproducing the audiovisual data according to the original content sequence.

18. The method of claim 17, further comprising:
including at least one erroneous cell interspersed with the plurality of cells of the audiovisual data.

19. The method of claim 18, wherein the correct first playback sequence omits reference to the at least one erroneous cell.

20. The method of claim 18, wherein at least one incorrect second playback sequence includes reference to at least one erroneous cell.

21. The method of claim 17, wherein the audiovisual product is playable according to DVD-Video specifications.

22. The method of claim 17, comprising reproducing the audiovisual product from a portable random-access storage medium.

23. The method of claim 17, comprising reproducing the audiovisual product from an optical disk according to a DVD-Video specification.

24. The method of claim 17, wherein the cells are jumbled in their order of arrangement.

25. An audiovisual product with an obscured playback sequence recorded on a non-transitory recording medium, comprising:
audiovisual data recorded on the recording medium intended for playback according to an original content sequence having a specific order, the audiovisual data being divided among a plurality of content cells;
a correct first playback sequence structured and arranged as executable code for a computer enabled playback device, which when executed by the computer enabled playback device will provide playback of the content cells in an order sequence according to the content sequence order; and
a plurality of incorrect second playback sequences structured and arranged as executable code for a computer enabled playback device, which if executed by the computer enabled playback device will provide playback of the content cells according to an out of order sequence with the relative presentation order of at least two cells in the original content sequence not maintained, the out of order sequence presenting a viewer with a jumbled playback obscuring the original content sequence, the correct first playback sequence obfuscated among the plurality of incorrect second playback sequences so that the first playback sequence is not self-evident, access to the original content thereby limited to a user able to select the correct first playback sequence.

26. The audiovisual product of claim 25, wherein the cells are jumbled in their order of arrangement.

27. The audiovisual product of claim 25, further including at least one erroneous cell interspersed with the plurality of cells of the audiovisual data.

28. The audiovisual product of claim 27, wherein the correct first playback sequence omits reference to the at least one erroneous cell.

29. The audiovisual product of claim 27, wherein at least one incorrect second playback sequence includes reference to at least one erroneous cell.

30. A method of copy protecting an audiovisual product, comprising the steps of:
receiving original audiovisual data intended for playback according to an original content sequence, the original audiovisual data comprising a plurality of cells containing presentation data;
inserting one or more erroneous cells containing erroneous presentation data, which are not proper to the original content sequence, into the plurality of cells; and
creating a plurality of sequence instructions each representing a playback sequence for playing back the cells in a specified order, each of the plurality of sequence instructions comprising a program chain (PGC), the PGCs each referencing one or more of the cells, including:
at least one correct sequence instruction where the playback sequence reproduces the original content sequence; and
a plurality of incorrect sequence instructions where the playback sequence does not reproduce the original content sequence, the plurality of incorrect sequence instructions each comprising a PGC which references at least one of the one or more erroneous cells.

31. The method of claim 30, comprising arranging the cells into a jumbled arrangement such that the original content sequence is scrambled.

32. The method of claim 30, comprising creating a larger number of the incorrect sequence instructions than of the correct sequence instructions, such that the relatively few correct sequence instructions are obscured amongst the relatively many incorrect sequence instructions.

33. The method of claim 30, wherein the incorrect sequence instructions each result in a playback obscuring the original content sequence.

34. The method of claim 30, wherein the erroneous presentation data comprises unplayable data.

35. The method of claim 30, comprising hiding the correct PGC amongst the incorrect PGCs.

36. The method of claim 30, comprising arranging the one or more incorrect sequence instructions to resemble the correct sequence instruction.

37. The method of claim 30, wherein the audiovisual product is playable according to a DVD-Video specification.

38. The method of claim 30, comprising recording the audiovisual product onto a portable random-access storage medium.

39. The method of claim 30, comprising recording the audiovisual product onto an optical disk according to a DVD-Video specification.

40. A non-transitory machine readable medium having recorded thereon computer implementable instructions for performing the method of claim 30.

41. An authoring apparatus adapted to perform the method of claim 30.

42. A non-transitory machine readable medium having recorded thereon presentation data including a plurality of cells, the cells comprising audiovisual data for playback using a playback apparatus, the recording medium also having recorded thereon a plurality of program chains (PGCs) for causing the playback apparatus to control playback of an audiovisual data sequence, the PGCs comprising references to the cells, wherein, on playback, one or more of the PGCs cause the playback apparatus to select cells for playback in a sequence, wherein:

the plurality of cells comprises:
a plurality of correct cells, each containing presentation data forming part of the audiovisual data sequence; and
at least one erroneous cell containing erroneous presentation data not proper to the audiovisual data sequence; and the PGCs comprise:
a correct PGC referencing the correct cells such that, if the cells are played back under the control of the correct PGC, the playback apparatus selects the correct cells for playback in accordance with the audiovisual data sequence; and
an incorrect PGC comprising a reference to the one or more erroneous cells such that, if the cells are played back under the control of the incorrect PGC, the incorrect PGC causes the playback apparatus to select the one or more erroneous cells for playback.

43. The recording medium according to claim 42, wherein the plurality of cells comprise a plurality of erroneous cells interspersed amongst the correct cells.

44. The recording medium according to claim 42, wherein the erroneous presentation data comprises unplayable data.

45. The recording medium according to claim 42, wherein the incorrect PGC is one of a plurality of the incorrect PGCs, wherein the correct PGC is hidden amongst the incorrect PGCs.

46. The recording medium according to claim 42, wherein the incorrect PGC is arranged to resemble the correct PGC.

47. The recording medium according to claim 42, wherein at least one of the PGCs comprises one or more programs (PG), each of which references a cell.

48. The recording medium according to claim 42, wherein the recording medium comprises a DVD-video disc.

49. A method of creating a protected audiovisual product, comprising the steps of:
receiving original audiovisual data intended for playback according to an original content sequence having a specific order, the original audiovisual data comprising a plurality of cells;
creating a plurality of sequence instructions, each representing a playback sequence for playing back the cells in a specified order, including;
a correct first playback sequence for playing back the cells in an order sequence according to the original content sequence order;
a plurality of incorrect second playback sequences, each if selected playing back the cells in an incorrect sequence with the relative presentation order of at least two cells in the original content sequence not maintained, the incorrect sequence presenting a viewer with an incomprehensible playback obscuring the original content sequence, wherein the audiovisual product is protected as access to the original content is limited to a user able to select the correct first playback sequence.

50. The method of claim 49, wherein each incorrect second sequence presents the cells in an out of order sequence, the out of order sequence presenting a viewer with a jumbled playback obscuring the original content sequence.

51. The method of claim 49, wherein each incorrect second sequence references at least one erroneous cell containing erroneous presentation data, the correct first playback sequence omitting reference to an erroneous cell containing erroneous presentation data.

52. The method of claim 49, further including obfuscating the correct first playback sequence among the plurality of incorrect second playback sequences so that the correct first playback sequence is not self-evident.

53. The method of claim 49, wherein the erroneous presentation data comprises unplayable data.

54. A non-transitory machine readable medium having recorded thereon computer implementable instructions for performing the method of claim 49.

55. A non-transitory machine readable medium having recorded thereon an audiovisual product provided by the method of claim 49.

\* \* \* \* \*